(12) United States Patent
Sakamura et al.

(10) Patent No.: US 12,240,956 B2
(45) Date of Patent: Mar. 4, 2025

(54) EXPANDED BEAD AND METHOD FOR PRODUCING THE SAME

(71) Applicant: JSP CORPORATION, Tokyo (JP)

(72) Inventors: Takumi Sakamura, Tochigi (JP); Hajime Ohta, Tochigi (JP)

(73) Assignee: JSP CORPORATION, Tokyo (JP)

( * ) Notice: Subject to any disclaimer, the term of this patent is extended or adjusted under 35 U.S.C. 154(b) by 81 days.

(21) Appl. No.: 17/591,725

(22) Filed: Feb. 3, 2022

(65) Prior Publication Data

US 2022/0267552 A1 Aug. 25, 2022

(30) Foreign Application Priority Data

Feb. 19, 2021 (JP) ................................. 2021-024744

(51) Int. Cl.
| | |
|---|---|
| *C08J 9/18* | (2006.01) |
| *B29C 44/34* | (2006.01) |
| *C08J 9/00* | (2006.01) |
| *C08J 9/12* | (2006.01) |
| *B29K 23/00* | (2006.01) |

(52) U.S. Cl.
CPC ............ *C08J 9/18* (2013.01); *B29C 44/3461* (2013.01); *C08J 9/0061* (2013.01); *C08J 9/122* (2013.01); *B29K 2023/12* (2013.01); *C08J 2323/10* (2013.01); *C08J 2423/12* (2013.01)

(58) Field of Classification Search
CPC ................................................. B23C 44/3461
See application file for complete search history.

(56) References Cited

U.S. PATENT DOCUMENTS

| | | | |
|---|---|---|---|
| 8,592,495 B2 | 11/2013 | Shima et al. | |
| 10,232,534 B2 * | 3/2019 | Tokiwa | ............... B29C 49/0005 |
| 10,336,880 B2 | 7/2019 | Oikawa et al. | |
| 10,487,188 B2 | 11/2019 | Kitahara et al. | |
| 2012/0100376 A1 * | 4/2012 | Sakaguchi | ............. C08J 9/0061 428/407 |

(Continued)

FOREIGN PATENT DOCUMENTS

| | | |
|---|---|---|
| CN | 102558696 A | 7/2012 |
| CN | 107108942 A | 8/2017 |

(Continued)

OTHER PUBLICATIONS

Machine translation JP-07137063-A (Year: 2023).*

(Continued)

*Primary Examiner* — Alexandre F Ferre
(74) *Attorney, Agent, or Firm* — Oblon, McClelland, Maier & Neustadt, L.L.P.

(57) ABSTRACT

An expanded bead having a tubular shape with a through hole and a method for producing the same are provided. The expanded bead includes a foamed core layer and a covering layer. A polyolefin-based resin included in the covering layer has a melting point lower than a melting point of a polypropylene-based resin included in the foamed core layer. An average hole diameter d of the through hole of the expanded bead is less than 1 mm, and a ratio d/D of the average hole diameter d to an average outer diameter D of the expanded bead is 0.4 or less. The polypropylene-based resin for the foamed core layer has a flexural modulus of 1,200 MPa or more and a melting point of 158° C. or lower.

20 Claims, 2 Drawing Sheets

(56) References Cited

U.S. PATENT DOCUMENTS

| | | | | |
|---|---|---|---|---|
| 2012/0115968 A1* | 5/2012 | Shima | .................. | C08J 9/18 |
| | | | | 427/222 |
| 2018/0022886 A1 | 1/2018 | Oikawa et al. | | |
| 2020/0282695 A1 | 9/2020 | Tokiwa | | |

FOREIGN PATENT DOCUMENTS

| EP | 3 243 868 A1 | | 11/2017 |
|---|---|---|---|
| EP | 3 309 197 A1 | | 4/2018 |
| JP | 07137063 A | * | 5/1995 |
| JP | 11-343361 A | | 12/1999 |
| JP | 2000-129028 A | | 5/2000 |
| JP | 2003-39565 A | | 2/2003 |
| JP | 2004-68016 A | | 3/2004 |
| JP | 2004-249558 A | | 9/2004 |
| TW | 201114816 A | | 5/2011 |

OTHER PUBLICATIONS

Extended European Search Report issued Jul. 5, 2022 in European Patent Application No. 22156020.4, 9 pages.

Combined Chinese Office Action and Search Report issued Mar. 21, 2023, in corresponding Chinese Patent Application No. 202210136666.4 (with English Translation and English Translation of Category of Cited Documents), 16 pages.

European Office Action issued May 31, 2023, in corresponding European Patent Application No. 22 156 020.4, 8 pages.

Chinese Office Action issued on Aug. 23, 2023 in Chinese Patent Application No. 202210136666.4 (with English translation), 14 pages.

Second Office Action issued Apr. 19, 2024, in European Patent Application No. 22 156 020.4.

Office Action issued Dec. 24, 2024, in Taiwanese Patent Application No. 110149561 (with English translation) citing documents 15 and 16.

* cited by examiner

EXPANDED BEAD AND METHOD FOR PRODUCING THE SAME

CROSS-REFERENCE TO RELATED APPLICATIONS

The present application claims the benefit of the filing date of Japanese Appl. No. 2021-024744, filed on Feb. 19, 2021, the content of each of which is incorporated by reference.

BACKGROUND OF THE INVENTION

Field of the Invention

The present invention relates to an expanded bead having a tubular shape with a through hole and a method for producing the same.

Description of Related Art

Polypropylene-based resin expanded beads have been used for various applications. Polypropylene-based resin expanded beads are used for producing a molded article of expanded beads. Specifically, expanded beads are filled in a molding mold, and steam is supplied to secondarily expand the expanded beads and to melt the surfaces of the expanded beads so as to fusion-bond the expanded beads to each other, thereby molding the expanded beads into a desired shape to provide a molded article of expanded beads. Since the molded article of expanded beads immediately after molding tends to swell due to secondary expansion, the molded article of expanded beads is cooled with water, air, or the like in the molding mold and then released from the molding mold after cooling in order to obtain a molded article of expanded beads having a desired shape.

In some cases, polypropylene-based resin expanded beads are pressurized by compressed air or the like before being filled into a molding mold in order to supplement secondary expandability thereof and are filled into the molding mold after a predetermined internal pressure is applied to the expanded beads in advance before being molded. The method of pressurizing the expanded beads before filling into the molding mold is called pre-pressurization, and since no special molding machine is required, it is often used to impart secondary expandability to the expanded beads.

When the molded article of expanded beads after in-mold molding is stored at normal temperature, steam that has flowed into the cells of the molded article of expanded beads during in-mold molding is condensed in the cells, the inside of the cells has a negative pressure, volume shrinkage occurs in the molded article of expanded beads, and the molded article may be severely deformed. In particular, when the molding heating temperature is high, the molded article of expanded beads may be significantly shrunk and deformed, and a desired shape may not be obtained. Therefore, after demolding the molded article of expanded beads, a aging step of allowing the molded article of expanded beads to stand for a predetermined time under a high-temperature atmosphere adjusted to a temperature of, for example, about 60° C. to 80° C. to recover the shape of the molded article of expanded beads is usually required.

In the in-mold molding of the polypropylene-based resin expanded beads, since the pre-pressurization and aging steps require capital investment and take a long time for the steps, shortening or omitting these steps leads to a significant improvement in the producibility of the molded article of the expanded beads. For example, JP 2003-39565 A discloses a technique of fusion-bonding expanded beads each including a foamed core layer and a covering layer while maintaining voids between the beads, and JP 2003-39565 A discloses that the aging step can be omitted. In addition, JP 2000-129028 A discloses a technique for in-mold molding of expanded beads using a polypropylene-based resin in which a melting point, a melt flow index, a Z-average molecular weight, and the like are adjusted to specific ranges, and JP 2000-129028 A discloses that it is possible to omit pre-pressurization and shorten the aging time.

SUMMARY OF THE INVENTION

However, in the technique disclosed in JP 2003-39565 A, although the aging step can be omitted, since voids are formed between the expanded beads of the molded article, the appearance of the molded article of expanded beads is remarkably poor, and the rigidity is insufficient depending on the application. In addition, the expanded beads described in JP 2003-39565 A have a narrow molding heating temperature range in which a molded article of expanded beads having a desired shape can be molded when the aging step is omitted. In the technique described in JP 2000-129028 A, although the aging step can be shortened, the aging step is still required, and when the aging step is omitted, the molded article of expanded beads is markedly shrunk and deformed, so that it is difficult to obtain a molded article of expanded beads having a desired shape.

The present invention has been made in view of such a background, and an object of the present invention is to provide an expanded bead capable of producing a molded article of expanded beads having a desired shape and excellent in appearance and rigidity in a wide molding heating temperature range from a low temperature to a high temperature even when pre-pressurization and aging steps are omitted, and a method for producing the expanded bead.

One aspect of the present invention is an expanded bead having a tubular shape with a through hole, including:
  a foamed core layer including a polypropylene-based resin; and
  a covering layer including a polyolefin-based resin, which covers the foamed core layer, the polyolefin-based resin having a melting point Tms that is lower than a melting point Tmc of the polypropylene-based resin for the foamed core layer, wherein
  an average hole diameter d of the through hole of the expanded bead is less than 1 mm, a ratio d/D of the average hole diameter d to an average outer diameter D of the expanded bead is 0.4 or less,
  the polypropylene-based resin for the foamed core layer has a flexural modulus of 1,200 MPa or more, and the melting point Tmc is 158° C. or lower.

Another aspect of the present invention is a method for producing an expanded bead having an apparent density of 10 kg/m$^3$ or more and 100 kg/m$^3$ or less, the method including expanding a multilayer resin particle having a tubular shape with a through hole, wherein
  the multilayer resin particle includes a core layer including a polypropylene-based resin and a covering layer including a polyolefin-based resin, which covers the core layer, the polyolefin-based resin having a melting point Tmrs that is lower than a melting point Tmrc of the polypropylene-based resin for the core layer,
  an average hole diameter dr of the through hole of the multilayer resin particle is less than 0.25 mm, a ratio dr/Dr of the average hole diameter dr to an average outer diameter Dr of the multilayer resin particle is 0.4 or less, the polypropylene-based resin for the core layer has a flexural modulus of 1,200 MPa or more, and the melting point Tmrc is 158° C. or lower.

With the above-mentioned expanded bead, it is possible to produce a molded article of expanded beads having a desired shape and excellent in appearance and rigidity in a wide molding heating temperature range from a low temperature to a high temperature even when pre-pressurization step and high-temperature aging step are omitted. Further, with the above expanded beads, the drying time of the molded article of expanded beads after molding can be shortened. Therefore, the present disclosure provides an expanded bead capable of significantly improving the production efficiency of a molded article of expanded beads excellent in rigidity and appearance.

DETAILED DESCRIPTION OF PREFERRED EMBODIMENTS

It should be noted in the present specification that the expression of a numerical range of numerical values or physical property values using "to" such as "X to Y", in which "to" is put between X and Y, means "X or more and Y or less". In addition, when a numerical value or a physical property value is expressed as a lower limit, a value equal to or more than the numerical value or the physical property value is meant, and when a numerical value or a physical property value is expressed as an upper limit, a value equal to or less than the numerical value or the physical property value is meant. In addition, "wt %" and "parts by weight" are substantially synonymous with "mass %" and "parts by mass", respectively. In the present specification, a polypropylene-based resin expanded bead is appropriately referred to as an "expanded bead", and a molded article of expanded beads is appropriately referred to as a "molded article". Note that an expanded bead having a foamed core layer composed of a polypropylene-based resin is generally referred to as a polypropylene-based resin expanded bead.

In the present specification, "without pressurization" means that pre-pressurization in which the expanded beads are pressurized with compressed air or the like before being filled into a molding mold to apply a predetermined internal pressure to the expanded beads in advance is not performed (that is, the pre-pressurization is omitted). In this case, the internal pressure of the expanded beads to be filled in the mold is normally 0 MPa (G). In addition, "without aging" means that the aging step of allowing the molded article of expanded beads after being demolded to stand in a high-temperature atmosphere to recover the shape of the molded article of expanded beads is not performed (that is, the aging step is omitted). In addition, an expanded beads in-mold molding method for producing a foam molded article of expanded beads without pressurization or aging is appropriately referred to as "molding without pressurization or aging".

Figure 1:
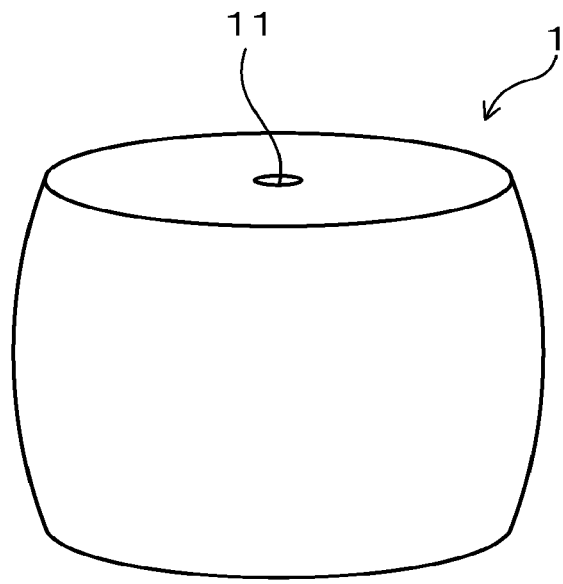
FIG. 1 is a schematic view of an appearance of an expanded bead.
Figure 2:
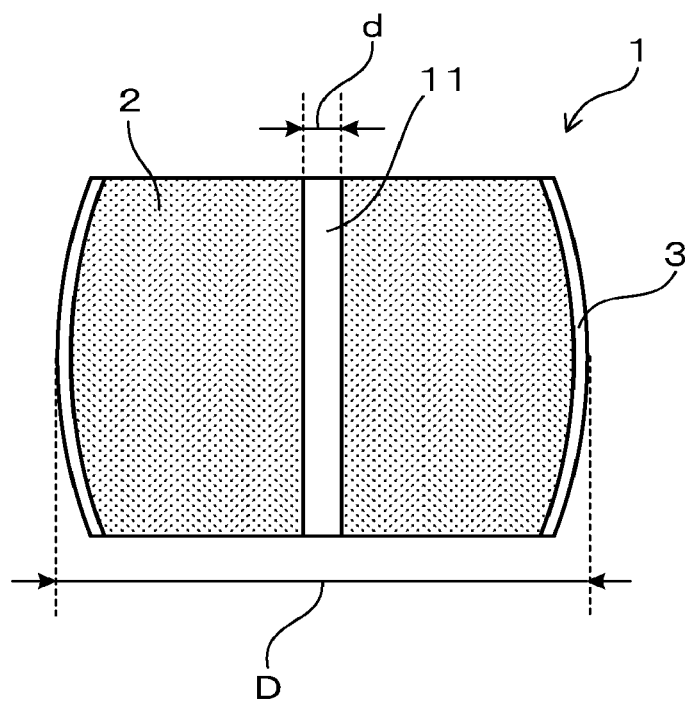
FIG. 2 is a schematic view of a cross section of the expanded bead.

FIGS. 1 and 2 illustrate an expanded bead, but the present invention is not limited to these drawings. As shown in FIGS. 1 and 2, an expanded bead 1 has a tubular shape and has a through hole 11. An average hole diameter d of the through hole 11 is less than 1 mm, and a ratio [d/D] of the average hole diameter d to an average outer diameter D of the expanded bead 1 is 0.4 or less. The expanded bead 1 has a foamed core layer 2 formed of a polypropylene-based resin and a covering layer 3 formed of a polyolefin-based resin. The polyolefin-based resin for the covering layer 3 has a melting point Tms lower than a melting point Tmc of the polypropylene-based resin for the foamed core layer 2. Further, the polypropylene-based resin for the foamed core layer 2 has a flexural modulus of 1,200 MPa or more and a melting point Tmc of 158° C. or lower. When the expanded bead 1 has the above-described configuration, a molded article of expanded beads having a desired shape and excellent in appearance and rigidity can be produced at a wide range of molding heating temperature from a low temperature to a high temperature even by molding without pressurization or aging. Furthermore, the drying time for the molded article of expanded beads obtained from the expanded bead is short. Therefore, a molded article of expanded beads excellent in rigidity and appearance can be produced with high producibility. The expanded bead can also be molded by performing both or either of pre-pressurization and a aging step.

The foamed core layer of the expanded bead is formed of a polypropylene-based resin. In the present specification, the polypropylene-based resin refers to a homopolymer of a propylene monomer and a propylene copolymer containing 50 mass % or more of a propylene-derived structural unit. For the polypropylene-based resin, a propylene copolymer obtained by copolymerizing propylene with another monomer is preferable. Specific examples preferably include a copolymer of propylene and an α-olefin having 4 to 10 carbon atoms, such as an ethylene-propylene copolymer, a butene-propylene copolymer, a hexene-propylene copolymer, and an ethylene-propylene-butene copolymer. These copolymers are, for example, random copolymers, block copolymers, and the like and are preferably random copolymers. The polypropylene-based resin may contain a plurality kind of polypropylene-based polymers.

The polypropylene-based resin composing the foamed core layer may contain a polymer other than the polypropylene-based resin as long as the purpose and effect of the present disclosure are not impaired. Examples of the other polymer include thermoplastic resins other than polypropylene-based resins, such as polyethylene-based resins and polystyrene-based resins, and elastomers. The content of the other polymer in the polypropylene-based resin composing the foamed core layer is preferably 20 mass % or less, more preferably 10 mass % or less, still more preferably 5 mass % or less, particularly preferably 0, which means that the foamed core layer substantially contains only the polypropylene-based resin as a polymer.

The polypropylene-based resin composing the foamed core layer is an ethylene-propylene random copolymer, and the content of the ethylene component in the copolymer is preferably 0.5 mass % or more and 2 mass % or less. The total of the ethylene component and the propylene component in the ethylene-propylene random copolymer is 100 mass %. In this case, the molding heating temperature range in which molding without pressurization or aging can be performed becomes wider. From the viewpoint that molding without pressurization or aging can be performed at a higher molding heating, the content of the ethylene component in the copolymer is more preferably 1.8 mass % or less, still more preferably 1.5 mass % or less, and particularly preferably 1.4 mass % or less. Meanwhile, from the viewpoint of restraining an excessive rise of the molding heating temperature, the content of the ethylene component in the copolymer is more preferably 0.8 mass % or more, still more preferably 1.0 mass % or more. The contents of the monomer components in the copolymer can be determined by IR spectrum measurement. The ethylene component and the propylene component of the ethylene-propylene copolymer mean a structural unit derived from ethylene and a structural unit derived from propylene in the ethylene-propylene copolymer, respectively. The content of each monomer component in the copolymer means the content of a structural unit derived from each monomer in the copolymer.

The polypropylene-based resin composing the foamed core layer has a melting point Tmc of 158° C. or lower. When the melting point Tmc exceeds 158° C., a higher molding heating temperature (that is, a high molding pressure) is required in order to mold a good molded article of expanded beads excellent in appearance and rigidity. In this case, it is difficult to suppress significant shrinkage and deformation of the molded article in molding without pressurization or aging. Therefore, there is the possibility that a range of a molding heating temperature in which molding without pressurization or aging can be performed is narrowed. The melting point Tmc of the polypropylene-based resin composing the foamed core layer is preferably 155° C. or lower, more preferably 153° C. or lower, from the viewpoint that it is possible to perform molding without pressurization or aging at a lower pressure and that the molding heating temperature range becomes wider. On the other hand, from the viewpoint of further enhancing the heat resistance, mechanical strength, and the like of the resulting molded article of expanded beads, the melting point Tmc of the polypropylene-based resin composing the foamed core layer is preferably 145° C. or higher, more preferably 148° C. or higher, still more preferably 150° C. or higher.

The melting point of the polypropylene-based resin is determined in accordance with JIS K 7121:1987. Specifically, "(2) When the melting temperature is measured after a certain heat treatment" is adopted for conditioning, a DSC curve is obtained by raising the temperature of a conditioned test piece from 30° C. to 200° C. at a heating rate of 10° C./min, and the peak temperature of the melting peak is regarded as the melting point. When a plurality of melting peaks appear in the DSC curve, the peak temperature of the melting peak having the largest area is taken as the melting point.

The foamed core layer may contain a polypropylene-based resin composition that includes at least two kind of polypropylene-based resins each having a different melting point, and that has a flexural modulus of 1200 MPa or more and a melting point of 158° C. or lower. Specifically, it is preferable to contain a polypropylene-based resin composition includes 70-97 wt % of a first polypropylene-based resin having a melting point exceeding 145° C. and 160° C. or lower and 3-30 wt % of a second polypropylene-based resin having a melting point exceeding 135° C. and not higher than 145° C. (it is noted that the total amount of the first polypropylene-based resin and the second polypropylene-based resin is 100 wt %). In this case, the secondary expandability of the expanded beads during in-mold molding can be improved without deterioration of rigidity of a resultant foam molded article of expanded beads, and thus it is made possible to obtain the effect that the intended effect of the present disclosure can be easily brought out even for such as an uneven-thickness molded article having a thick wall part and a thin wall part. From the viewpoint of improvement of such effect, it is more preferable that the content of the first polypropylene-based resin is 75-95 wt % and the content of the second polypropylene-based resin is 5-25 wt % (it is noted that the total amount of the first polypropylene-based resin and the second polypropylene-based resin is 100 wt %), and it is still more preferable that the content of the first polypropylene-based resin is 80-90 wt % and the content of the second polypropylene-based resin is 10-20 wt % (it is noted that the total amount of the first polypropylene-based resin and the second polypropylene-based resin is 100 wt %). Further, from the same viewpoint, it is more preferable that the melting point of the first polypropylene-based resin exceeds 150° C. and not higher than 155° C. and the melting point of the second polypropylene-based resin exceeds 140° C. and not higher than 145° C.

It is noted that the measuring method for a melting point of the polypropylene-based resin composition is the same as the measuring method for a melting point of the polypropylene-based resin. It is also noted that the measuring method for a flexural modulus of the polypropylene-based resin composition is the same as the measuring method for a flexural modulus of the polypropylene-based resin which will be described later.

Further, from the viewpoint of further improvement in the above-mentioned effect, the difference between the melting point $Tmc_1$ of the first polypropylene-based resin and the melting point $Tmc_2$ of the second polypropylene-based resin (that is $Tmc_1 - Tmc_2$) is preferably 5° C. or more and lower than 15° C., and is more preferably 8° C. or more and 13° C. or lower.

From the viewpoint of further enhancing the expandability and moldability, the melt mass flow rate (that is, MFR) of the polypropylene-based resin composing the foamed core layer is preferably 5 g/10 min or more, more preferably 6 g/10 min or more. On the other hand, from the viewpoint of further enhancing the rigidity of the molded article, the MFR is preferably 10 g/10 min or less, more preferably 8 g/10 min or less. The MFR of the polypropylene-based resin is a value measured under the conditions of a test temperature of 230° C. and a load of 2.16 kg in accordance with JIS K 7210-1:2014.

The flexural modulus of the polypropylene-based resin composing the foamed core layer is 1,200 MPa or more. When the flexural modulus of the polypropylene-based resin composing the foamed core layer is less than 1,200 MPa, it is difficult to suppress shrinkage of the molded article particularly under a condition of a high molding heating temperature, and there is the possibility that a molded article having a desired shape cannot be obtained when the aging step is omitted. That is, a molding heating temperature range necessary for obtaining a molded article having a desired shape and a good appearance by molding without aging is narrowed. The flexural modulus of the polypropylene-based resin is preferably 1,300 MPa or more, more preferably 1,350 MPa or more, still more preferably 1,400 MPa or more, from the viewpoint of more easily suppressing shrinkage and deformation of the molded article when the aging step is omitted. On the other hand, from the viewpoint of suppressing an excessive increase in the molding heating temperature, the flexural modulus of the polypropylene-based resin is preferably 1,800 MPa or less, more preferably 1,600 MPa or less, still more preferably 1,500 MPa or less. The flexural modulus of the polypropylene-based resin can be determined in accordance with JIS K 7171:2008.

The crystallization temperature of the polypropylene-based resin composing the foamed core layer of the expanded bead is preferably 105° C. or higher and 115° C. or lower, more preferably 110° C. or higher and 115° C. or lower, from the viewpoint of further improving the moldability in molding without pressurization or aging. The crystallization temperature of the polypropylene-based resin is measured using a heat flux differential scanning calorimeter in accordance with JIS K 7121:2012. When a plurality of crystallization peaks appear in the DSC curve, the peak temperature of the crystallization peak having the highest peak height is defined as the crystallization temperature.

From the viewpoint of improving the moldability of the expanded bead, the rigidity of the molded article, and the like, the closed cell content of the expanded beads is preferably 80% or more, more preferably 85% or more, still more preferably 90% or more, and particularly preferably 95% or more. The closed cell content of the expanded beads can be measured using an air-comparison pycnometer in accordance with the procedure C described in ASTM D 2856 70.

The expanded bead includes the covering layer that covers the foamed core layer and is composed of a polyolefin-based resin. When the expanded bead does not include the covering layer, a higher molding heating temperature (that is, a high molding pressure) is required in order to mold a good molded article of expanded beads excellent in appearance and rigidity. In this case, it is difficult to suppress significant shrinkage and deformation of the molded article in molding without pressurization or aging, so that the molding heating temperature range in which molding without pressurization or aging can be performed may be narrowed. The covering layer is made of a polyolefin-based resin. Examples of the polyolefin-based resin include polyethylene-based resins, polypropylene-based resins, and polybutene-based resins. From the viewpoint of adhesiveness to the foamed core layer, the polyolefin-based resin is preferably a polyethylene-based resin or a polypropylene-based resin, more preferably a polypropylene-based resin. Examples of the polypropylene-based resin include an ethylene-propylene copolymer, an ethylene-butene copolymer, an ethylene-propylene-butene copolymer, and a propylene homopolymer, and among these polymers, an ethylene-propylene copolymer or an ethylene-propylene-butene copolymer is preferable.

The polyolefin-based resin for the covering layer has the melting point Tms lower than the melting point Tmc of the polypropylene-based resin for the foamed core layer. That is, Tms<Tmc. When the melting point Tms of the polyolefin-based resin of the covering layer is equal to or higher than the melting point Tmc of the polypropylene-based resin for the foamed core layer (that is, when Tms Tmc), the ability of fusion-bonding between the expanded beads during molding decreases, and molding at a low temperature becomes difficult, the molding heating temperature range within which molding can be performed without pressurization or aging may be narrow. From the viewpoint of expanding the molding heating temperature range within which molding can be performed without pressurization or aging, the relation is preferably Tmc−Tms≥5, more preferably Tmc−Tms≥10, still more preferably Tmc−Tms≥15. From the viewpoint of suppressing peeling between the foamed core layer and the covering layer, and suppressing adhesion between the expanded beads, and the like, Tmc−Tms≤35 is preferably satisfied, and Tmc−Tms≤25 is more preferably satisfied.

From the viewpoint of further enhancing the ability of fusion-bonding of the expanded bead during molding, the melting point Tms of the polyolefin-based resin composing the covering layer is preferably 120° C. or higher and 145° C. or lower, more preferably 125° C. or higher and 140° C. or lower. The melting point of the polyolefin-based resin composing the covering layer is determined in accordance with JIS K 7121:1987. Specifically, it is determined by similar conditions and methods to those for the polypropylene-based resin composing the above-mentioned foamed core layer.

From the viewpoint of reliably suppressing peeling between the foamed core layer and the covering layer, the MFR of the polyolefin-based resin composing the covering layer is preferably about equal to the MFR of the polypropylene-based resin composing the foamed core layer, specifically preferably 2 to 15 g/10 min, more preferably 3 to 12 g/10 min, still more preferably 4 to 10 g/10 min. When the polyolefin-based resin is a polypropylene-based resin, the MFR is a value measured under the conditions of a test temperature of 230° C. and a load of 2.16 kg in accordance with JIS K 7210-1:2014, and when the polyolefin-based resin is a polyethylene-based resin, the MFR is a value measured under the conditions of a test temperature of 190° C. and a load of 2.16 kg in accordance with JIS K 7210-1: 2014.

The expanded bead is a particle having a multilayer structure including the foamed core layer and the covering layer covering the foamed core layer. The foamed core layer is composed of a polypropylene-based resin in a foamed state, and the covering layer is composed of a polyolefin-based resin in a foamed state or an unfoamed state. The covering layer is preferably substantially in an unfoamed state. "Substantially unfoamed" means that there is little cellular structures. The thickness of the covering layer is, for example, 0.5 to 100 μm. Further, an intermediate layer may be further provided between the foamed core layer and the covering layer.

It is noted that the foamed core layer may be completely covered by the covering layer or may be partly exposed. Examples of the structure in which the foamed core layer is exposed include the structure in which the side surface of the foamed core layer having a cylindrical shape is covered by the covering layer while the top and bottom surfaces of the cylinder-shaped foamed core layer are exposed.

The mass ratio (ratio of percentages by mass) of the resin composing the foamed core layer to the resin composing the covering layer is preferably 99.5:0.5 to 80:20, more preferably 99:1 to 85:15, still more preferably 97:3 to 90:10 from the viewpoint of enhancing the moldability while maintaining the rigidity of the molded article. The mass ratio is represented by the ratio the resin composing the foamed core layer:the resin composing the covering layer.

The expanded bead preferably has a crystal structure that shows an endothermic peak (that is, a resin specific peak) due to melting specific to the polypropylene-based resin and one or more melting peaks (that is, high-temperature peaks) on a high temperature side thereof in a DSC curve obtained when heating the expanded beads from 23° C. to 200° C. at a heating rate of 10° C./min. The DSC curve is obtained by differential scanning calorimetry (DSC) in accordance with JIS K 7121:1987, using 1 to 3 mg of expanded beads as a test sample.

The resin specific peak is an endothermic peak due to melting specific to the polypropylene-based resin composing the expanded beads and is considered to be due to endotherm at the time of melting of crystals inherent in the polypropylene-based resin. On the other hand, the endothermic peaks on the high temperature side of the resin specific peak (that is, the high-temperature peaks) are endothermic peaks appearing on the higher temperature side than the resin specific peak in the DSC curve. When this high-temperature peaks appear, it is presumed that secondary crystals are present in the resin. As described above, in the DSC curve obtained when heating from 23° C. to 200° C. (that is, first heating) is performed at a temperature heating rate of 10° C./min, then cooling from 200° C. to 23° C. is performed at a cooling rate of 10° C./min, and then heating from 23° C. to 200° C. (that is, second heating) is performed again at a temperature heating rate of 10° C./min, only an endothermic peak due to melting specific to the polypropylene-based resin composing the expanded beads is observed, so that a resin specific peak and a high-temperature peak can be distinguished. The temperature at the peak of the resin specific peak may be slightly different between the first heating and the second heating, but the difference is usually within 5° C.

The heat of fusion of the high-temperature peak of the expanded beads is preferably 5 to 40 J/g, more preferably 7 to 30 J/g, still more preferably 10 to 20 J/g.

The ratio of the heat of fusion of the high-temperature peak to the heat of fusion of the entire melting peaks in the DSC curve (the heat of fusion of the high-temperature peak/the heat of fusion of the entire melting peaks) is preferably 0.05 to 0.3, more preferably 0.1 to 0.25, still more preferably 0.15 to 0.2.

It is considered that the expanded beads have particularly excellent mechanical strength and excellent in-mold moldability due to the presence of secondary crystals appearing as the high-temperature peak by setting the ratio between the heat of fusion of the high-temperature peak and the heat of fusion of the entire melting peaks within such a range.

Here, the heat of fusion of the entire melting peaks refers to the sum of the heat of fusion determined from the areas of all the melting peaks in the DSC curve.

The expanded beads have through holes as described above. Therefore, molding at a low pressure becomes possible. This is considered to be because the heating medium such as steam supplied in the molding step passes through the through holes to reach the inside of a group of the expanded beads, whereby the entire expanded beads filled in the mold are sufficiently heated, and the secondary expandability and ability of fusion-bonding of the expanded beads are improved. Furthermore, since the expanded beads each have a covering layer composed of a resin having a melting point lower than that of the foamed core layer, the expanded beads are easily fusion-bonded to each other during molding. Also from such a viewpoint, the expanded beads can be molded at a low pressure, and it is possible to produce a molded article of expanded beads excellent in appearance and rigidity in a wide molding pressure range from a low pressure to a high pressure.

Each expanded bead having a tubular shape with a through hole preferably has at least one tubular hole penetrating in the axial direction of the expanded bead having a columnar shape such as a cylinder and a prism. It is more preferable that the expanded bead has a cylindrical shape and has a tubular hole penetrating in the axial direction thereof.

When the expanded bead does not have a through hole, secondary expandability and ability of fusion-bonding become insufficient at a low molding heating temperature (that is, low pressure) in molding without pressurization or aging, and it may be difficult to mold a good molded article of expanded beads. In addition, at a high molding heating temperature (that is, high pressure), it may be difficult to suppress shrinkage and deformation of the molded article. On the other hand, even when the expanded beads have through holes, if the average hole diameter d is too large, the appearance and the rigidity of the molded article may be deteriorated. In addition, at a low molding heating temperature (that is, low pressure), the secondary expandability of the expanded beads during in-mold molding may decrease, leading to a narrower molding heating temperature range in which molding without pressurization or aging can be performed. Furthermore, the drying time after molding may be prolonged. From this viewpoint, the average hole diameter d of the expanded beads is less than 1 mm as described above. The average hole diameter d of the expanded beads is preferably 0.95 mm or less, more preferably 0.92 mm or less, still more preferably 0.90 mm or less, from the viewpoint of further improving the appearance and rigidity of the molded article and from the viewpoint of further widening the range of the molding heating temperature in which molding without pressurization or aging is possible. From the viewpoint of restraining the through hole from being crushed and being closed during filling expanded beads in a mold and the viewpoint of ease of production, the lower limit of the average hole diameter d of the expanded beads is preferably 0.2 mm, and is more preferably 0.4 mm.

The average hole diameter d of the through holes of the expanded beads is determined as follows. At positions where the areas of cut surfaces are maximum, 50 or more expanded beads randomly selected from a group of expanded beads are cut perpendicularly to the penetration direction of the through holes. The cut surface of each expanded bead is photographed, the cross-sectional area (specifically the opening area) of the through hole portion is determined. The diameter of a virtual perfect circle having the same area as the above area is calculated, and the arithmetic average thereof is taken as the average hole diameter d of the through holes of the expanded beads. Even when the size of the through hole of each expanded bead is not uniform in the through hole diameter in the penetration direction, the through hole diameter of each expanded bead is determined by the hole diameter at the position where the area of the cut surface of the expanded bead is maximized as described above.

The average outer diameter D of the expanded beads is preferably 2 mm or more, more preferably 2.5 mm or more, still more preferably 3 mm or more, from the viewpoint that the wall thickness of the tubular expanded beads increases and that the secondary expandability of the expanded beads and the rigidity of the molded article are improved. On the other hand, the average outer diameter is preferably 5 mm or less, more preferably 4.5 mm or less, still more preferably 4.3 mm or less, from the viewpoint of improving the filling property into the molding mold during molding. In addition, from the same viewpoint, the aspect ratio of the expanded beads (L/D) is preferably 2 or less, more preferably 1.5 or less, and further more preferably 1.2 or less, in the meanwhile, it is preferably 0.5 or more and more preferably 0.8 or more.

The ratio d/D of the average hole diameter d to the average outer diameter D of the expanded beads is 0.4 or less. When the ratio d/D exceeds 0.4, the appearance and the rigidity of the molded article may be deteriorated. In this case, the secondary expandability of the expanded beads during in-mold molding may be deteriorated. From the viewpoint of improving the appearance of the molded article, the viewpoint of further improving the rigidity, and the viewpoint of further improving the secondary expandability, d/D is preferably 0.35 or less, more preferably 0.3 or less, still more preferably 0.25 or less. Incidentally, the ratio d/D is preferably 0.1 or more from the viewpoint of more stably exhibiting the effect of expanding the range of the molding heating temperature in which molding without pressurization or aging can be performed and from the viewpoint of ease of production.

The average outer diameter D of the expanded beads is determined as follows. At positions where the areas of cut surfaces are maximum, 50 or more expanded beads randomly selected from a group of expanded beads are cut perpendicularly to the penetration direction of the through holes. The cut surface of each expanded bead is photographed, and the cross-sectional area (specifically cross-sectional area also including the opening portion of the through hole) of the expanded bead is determined. The diameter of a virtual perfect circle having the same area as the above area is calculated, and the arithmetic average thereof is taken as the average outer diameter D of the expanded beads. Even when the outer diameter of each expanded bead is not uniform in the penetration direction, the outer diameter of each expanded bead is determined by the outer diameter at the position where the area of the cut surface of the expanded bead is maximized in the direction perpendicular to the penetration direction as described above.

The average value of a wall thickness t of the tubular expanded beads is preferably 1.2 mm or more and 2 mm or less. When the average value of the wall thickness t is within this range, the wall thickness of the expanded beads is sufficiently thick, so that the secondary expandability during in-mold molding is further improved. Thus, molding without pressurization or aging at a lower molding heating temperature becomes possible. In addition, the expanded beads are more hardly crushed against an external force, and the rigidity of the molded article is further improved. From these viewpoints, the average wall thickness t of the expanded beads is more preferably 1.3 mm or more, still more preferably 1.5 mm or more.

The average wall thickness t of the expanded beads is a distance from the surface (that is, the outer surface) of each expanded bead to the outer edge (that is, the inner surface of the expanded bead) of the through hole and is a value determined by Formula (1) below.

$$t=(D-d)/2 \quad (1)$$

d: Average hole diameter of through holes (mm)
D: Average outer diameter of expanded beads (mm)

The ratio t/D of the average wall thickness t to the average outer diameter D of the expanded beads is preferably 0.35 or more and 0.5 or less. When t/D is within the above range, the filling property of the expanded beads is good, and the secondary expandability is further improved in the in-mold molding of the expanded beads. Therefore, a molded article having excellent rigidity can be produced at a lower molding heating temperature.

From the viewpoint of a balance between a lightweight property and rigidity of the molded article, the apparent density of the expanded beads is preferably 10 $kg/m^3$ or more and 100 $kg/m^3$ or less, more preferably 15 $kg/m^3$ or more and 80 $kg/m^3$ or less, still more preferably 20 $kg/m^3$ or more and 50 $kg/m^3$ or less, particularly preferably 25 $kg/m^3$ or more and 45 $kg/m^3$ or less. Conventionally, in particular, in the case of producing a molded article having a small apparent density, the molded article is likely to be significantly deformed after demolding, and it is difficult to omit the aging step. On the other hand, for the expanded beads in the present disclosure, even when the apparent density is small, the aging step can be omitted, and a molded article having a desired shape can be produced even without aging.

The apparent density of the expanded beads can be determined by immersing a group of expanded beads (weight W (g) of the group of expanded beads), which has been left for 1 day under the conditions of a relative humidity of 50%, 23° C., and 1 atm, in an alcohol (such as ethanol) contained in a measuring cylinder at 23° C. using a wire mesh or the like, determining a volume V (L) of the group of expanded beads from the increase in the liquid level, dividing the weight of the group of expanded beads by the volume of the group of expanded beads (W/V), and converting the unit into [$kg/m^3$].

From the viewpoints of widening the molding heating temperature range in which molding without pressurization or aging can be performed, from the viewpoint of further enhancing the rigidity of the molded article, and from the viewpoint and of further improving the appearance, the ratio of the apparent density of the expanded beads to the bulk density of the expanded beads (that is, apparent density/bulk density) is preferably 1.7 or more and preferably 2.3 or less, more preferably 2.1 or less, still more preferably 1.9 or less.

The bulk density of the expanded beads is determined as follows. Expanded beads are randomly taken out from the group of expanded beads and placed in a measuring cylinder having a capacity of 1 L, a large number of the expanded beads are accommodated up to a scale of 1 L so as to be in a natural deposition state, a mass W2 [g] of the accommodated expanded beads is divided by an accommodation volume V2 (1 L) (W2/V2), and the unit is converted to [$kg/m^3$], whereby the bulk density of the expanded beads is determined.

The expanded beads have excellent in-mold moldability and can form a molded article having a good appearance and high rigidity at a molding heating temperature in a wide range from a low temperature to a high temperature. In addition, it is possible to produce a molded article having a good appearance and high rigidity without significantly shrinking and deforming the molded article even if the pre-pressurization and aging steps are omitted. The reason why the expanded beads exhibit such effects is not necessarily clear but is considered as follows.

The foamed core layer of each expanded bead contains a polypropylene-based resin having a flexural modulus of a specific value or more as a base material resin. Therefore, it is considered that shrinkage of the molded article after being demolded is easily suppressed and that a dimensional change is suppressed even under a high-temperature molding heating temperature condition.

In addition, the expanded bead has a multilayer structure having a foamed core layer and a covering layer, the polypropylene-based resin composing the foamed core layer has a melting point of a predetermined value or lower, and the expanded bead has a through hole of a predetermined shape. Therefore, since the expanded beads are excellent in ability of fusion-bonding and secondary expandability, molding can be performed at a lower molding heating temperature. By molding at a low molding heating temperature, the amount of heat received by the expanded beads from the heating medium such as steam in in-mold molding can be suppressed to a low level. In addition, the internal temperature of a molded article that has been demolded is restrained from excessively. It is considered that a dimensional change of the molded article is suppressed accordingly.

Further, the molded article has minute communicating voids derived from the through holes of the expanded beads. Therefore, it is considered that the air flows into the cells in the molded article immediately after demolding, and the internal pressure of the entire molded article is increased, so that the dimensions of the molded article are easily stabilized early.

From the above reasons, it is considered that the expanded beads have good expandability even when the expanded beads are subjected to molding without pressurization or aging and that the dimensions of the molded article are easily stabilized, so that a good molded article can be produced in a wide molding heating temperature range from a low temperature to a high temperature.

The expanded beads can be produced, for example, by a method in which multilayer resin particles each having a core layer composed of a polypropylene-based resin and a covering layer covering the core layer and composed of a polyolefin-based resin are dispersed in a dispersion medium (such as liquid), the multilayer resin particles are impregnated with a foaming agent, and the multilayer resin particles containing the foaming agent are released under a low pressure (that is, the dispersion medium release foaming method). Specifically, it is preferable that the multilayer resin particles are dispersed in a dispersion medium in a sealed container, and after heating, a foaming agent is injected to impregnate the multilayer resin particles with the foaming agent. Thereafter, after a holding step of growing secondary crystals at a constant temperature, it is preferable that at least the core layers in the multilayer resin particles containing the foaming agent be expanded by releasing the contents in the sealed container to a low pressure to obtain expanded beads. As mentioned above, production of the expanded beads by the dispersion medium release foaming method which enables a single expanding step is also referred to as one-step expansion.

The expanded beads of the present disclosure are preferably produced by the following production method.

The production method is a method for producing an expanded bead having an apparent density of 10 kg/m$^3$ or more and 100 kg/m$^3$ or less, the method including expanding a multilayer resin particle having a tubular shape with a through hole,
  in which the multilayer resin particle includes a core layer composed of a polypropylene-based resin and a covering layer covering the core layer and being composed of a polyolefin-based resin, a melting point Tmrs of the polyolefin-based resin composing the covering layer being lower than a melting point Tmrc of the polypropylene-based resin composing the core layer,
  an average hole diameter dr of the through hole of the multilayer resin particle is less than 0.25 mm, a ratio dr/Dr of the average hole diameter dr to an average outer diameter Dr of the multilayer resin particle is 0.4 or less, and
  the polypropylene-based resin composing the core layer has a flexural modulus of 1,200 MPa or more and the melting point Tmrc of 158° C. or lower.

According to this method, low-density expanded beads can be easily produced without performing two-step expansion described later.

In the expansion of the multilayer resin particles, it is preferable to impregnate the multilayer resin particles dispersed in an aqueous medium in the sealed container with a foaming agent under heating and to discharge the multilayer resin particles containing the foaming agent from the sealed container together with the aqueous medium to expand the beads. The aqueous medium is specifically a liquid such as water.

Even if the average hole diameter dr of the multilayer resin particles is less than 0.25 mm, the average hole diameter d of the expanded beads may be as large as 1 mm or more depending on the expansion ratio of the expanded beads to be produced (that is, depending on the apparent density of the expanded beads). In the above production method, multilayer resin particles having an average hole diameter dr of less than 0.25 mm are expanded to produce expanded beads having an apparent density of 10 kg/m$^3$ or more and 100 kg/m$^3$ or less. Therefore, the average hole diameter d of the expanded beads can be, for example, less than 1 mm.

In addition, according to the above-described production method, for example, expanded beads having a high magnification (that is, low density) can be produced by one-step expansion, and expanded beads having an apparent density of 45 kg/m$^3$ or less can be produced by one-step expansion without performing two-step expansion.

The multilayer resin particles are produced, for example, by the strand-cut method as follows. Two extruders of an extruder for forming a core layer and an extruder for forming a covering layer are connected to a coextrusion die, a polypropylene-based resin for forming a core layer and an additive supplied as necessary are melt-mixed in the extruder for forming a core layer, and a polyolefin-based resin for forming a covering layer and an additive supplied as necessary are melt-mixed in the extruder for forming a covering layer. Next, the melt-mixed products are extruded and joined in the die to form a sheath-core type composite including a tubular core layer in an unexpanded state and a covering layer in an unexpanded state covering an outer surface of the tubular core layer, and the composite is cooled through a water bath filled with water while being extruded in a strand shape from a pore of a spinneret attached to a tip of the extruders. The extrudate after cooling is cut into a desired size, for example, with a pelletizer. In this way, multilayer resin particles each including a core layer having a tubular shape with a through hole and a covering layer covering the core layer can be obtained. A hot cutting method, an underwater cutting method, and the like can be used for producing the multilayer resin particles, other than the strand cutting method mentioned above.

The bead diameter of the multilayer resin particles is preferably 0.1 to 3.0 mm, more preferably 0.3 to 1.5 mm. The length/outer diameter ratio of the resin particles is preferably 0.5 to 5.0, more preferably 1.0 to 3.0. The average mass per one bead (determined from the mass of 200 randomly selected beads) is preferably 0.1 to 20 mg, more preferably 0.2 to 10 mg, still more preferably 0.3 to 5 mg, particularly preferably 0.4 to 2 mg. The mass ratio of the core layer and the covering layer in the multilayer resin particle is preferably 99.5:0.5 to 80:20, more preferably 99:1 to 85:15, still more preferably 97:3 to 90:10.

By adjusting the hole diameter dr of the through hole of the core layer in the multilayer resin particle, the average hole diameter d of the through holes of the foamed core layers in the expanded beads can be adjusted to the above desired range. The hole diameter dr of the through hole of the core layer of the multilayer resin particle can be adjusted with, for example, the hole diameter (that is, the inner diameter of a die) of a small hole of a die for forming the through hole. In addition, by adjusting the bead diameter and average mass of the multilayer resin particles, the average outer diameter and average wall thickness of the expanded beads can be adjusted to the above desired ranges.

From the viewpoint of more reliably producing expanded beads in which the average hole diameter d of the through holes is less than 1 mm and in which the ratio d/D of the average hole diameter d to the average outer diameter D is 0.4 or less, the average hole diameter dr of the through holes of the multilayer resin particles is more preferably less than 0.24 mm, still more preferably 0.22 mm or less. From the viewpoint of the production stability of the multilayer resin particles having through holes, the average hole diameter dr of the through holes of the multilayer resin particles is preferably 0.1 mm or more.

From the same viewpoint, the ratio dr/Dr of the average hole diameter dr to the average outer diameter Dr of the multilayer resin particles is more preferably 0.3 or less, still more preferably 0.25 or less, particularly preferably 0.2 or less. From the viewpoint of the production stability of the multilayer resin particles having through holes, the ratio dr/Dr of the average hole diameter dr to the average outer diameter Dr of the multilayer resin particles is preferably 0.1 or more.

The average hole diameter dr of the through holes of the multilayer resin particles is determined as follows. At positions where the areas of cut surfaces are maximum, 50 or more multilayer resin particles randomly selected from a group of multilayer resin particles are cut perpendicularly to the penetration direction of the through holes. The cut surface of each multilayer resin particle is photographed, the cross-sectional area (specifically the opening area) of the through hole portion is determined. The diameter of a virtual perfect circle having the same area as the above area is calculated, and the arithmetic average thereof is taken as the average hole diameter dr of the through holes of the multilayer resin particles. Even when the size of the through hole of each multilayer resin particle is not uniform in the through hole diameter in the penetration direction, the through hole diameter of each multilayer resin particle is determined by the hole diameter at the position where the area of the cut surface of the multilayer resin particle is maximized as described above.

The average outer diameter Dr of the through holes of the multilayer resin particles is determined as follows. At positions where the areas of cut surfaces are maximum, 50 or more multilayer resin particles randomly selected from a group of multilayer resin particles are cut perpendicularly to the penetration direction of the through holes. The cut surface of each multilayer resin particle is photographed, the cross-sectional area (specifically cross-sectional area also including the opening portion of the through hole) of the multilayer resin particle is determined. The diameter of a virtual perfect circle having the same area as the above area is calculated, and the arithmetic average thereof is taken as the average outer diameter Dr of the multilayer resin particles. Even when the outer diameter of each multilayer resin particle is not uniform in the penetration direction, the outer diameter of each multilayer resin particle is determined by the outer diameter at the position where the area of the cut surface of the multilayer resin particle is maximized in the direction perpendicular to the penetration direction as described above.

The particle size, the length/outer diameter ratio, and the average mass of the multilayer resin particles in the strand cutting method can be adjusted by appropriately changing the extrusion speed, the take-up speed, the cutter speed, and the like when the resin melt is extruded.

As a dispersion medium (specifically a liquid) in which the multilayer resin particles obtained as described above are dispersed in a sealed container, an aqueous dispersion medium is used. The aqueous dispersion medium is a dispersion medium (specifically a liquid) containing water as a main component. The proportion of water in the aqueous dispersion medium is preferably 60 mass % or more, more preferably 70 mass % or more, still more preferably 80 mass % or more. Examples of the dispersion medium other than water in the aqueous dispersion medium include ethylene glycol, glycerin, methanol, and ethanol.

Additives such as a cell controlling agent, a crystal nucleating agent, a colorant, a flame retardant, a flame retardant synergist, a plasticizer, an antistatic agent, an antioxidant, an ultraviolet inhibitor, a light stabilizer, a conductive filler, and an antibacterial agent can be added to the core layer of the multilayer resin particle as necessary. Examples of the cell controlling agent include inorganic powders such as talc, mica, zinc borate, calcium carbonate, silica, titanium oxide, gypsum, zeolite, borax, aluminum hydroxide, and carbon; and organic powders such as a phosphate nucleating agent, a phenolic nucleating agent, an amine nucleating agent, and a polyfluoroethylene resin powder. When the cell controlling agent is added, the content of the cell controlling agent is preferably 0.01 to 1 parts by mass based on 100 parts by mass of the polypropylene-based resin.

In the dispersion medium release foaming method, it is preferable to add a dispersant to the dispersion medium so that the multilayer resin particles heated in the container are not fused to each other. The dispersant may be any dispersant as long as it prevents fusion of the multilayer resin particles in the container and can be used regardless of whether the dispersant is organic or inorganic, but a fine inorganic substance is preferable from the viewpoint of ease of handling. Examples of the dispersant include clay minerals such as amsnite, kaolin, mica, and clay. The clay mineral may be natural or synthetic. Examples of the dispersant include aluminum oxide, titanium oxide, basic magnesium carbonate, basic zinc carbonate, calcium carbonate, and iron oxide. As the dispersant, one kind or two or more kinds are used. Among them, a clay mineral is preferably used as the dispersant. The dispersant is preferably added in an amount of about 0.001 to 5 parts by mass per 100 parts by mass of the multilayer resin particles.

When a dispersant is used, an anionic surfactant such as sodium dodecylbenzenesulfonate, sodium alkylbenzenesulfonate, sodium lauryl sulfate, or sodium oleate is preferably used in combination as a dispersing aid. The addition amount of the dispersing aid is preferably 0.001 to 1 part by mass per 100 parts by mass of the multilayer resin particles.

As a foaming agent for expanding the multilayer resin particles, a physical foaming agent is preferably used. Examples of the physical foaming agent include inorganic physical foaming agents and organic physical foaming agents, and examples of the inorganic physical foaming agent include carbon dioxide, air, nitrogen, helium, and argon. Examples of the organic physical foaming agent include aliphatic hydrocarbons such as propane, butane, and hexane, cyclic aliphatic hydrocarbons such as cyclopentane and cyclohexane, and halogenated hydrocarbons such as chlorofluoromethane, trifluoromethane, 1,1-difluoromethane, 1-chloro-1,1-dichloroethane, 1,2,2,2-tetrafluoroethane, methyl chloride, ethyl chloride, and methylene chloride. The physical foaming agent may be used singly or in combination of two or more kinds thereof. In addition, the inorganic physical foaming agent and the organic physical foaming agent may be mixed and used. From the viewpoint of environmental load and handleability, an inorganic physical foaming agent is preferably used, and carbon dioxide is more preferably used. When an organic physical foaming agent is used, it is preferable to use n-butane, i-butane, n-pentane, or i-pentane from the viewpoint of solubility in the polypropylene-based resin and expandability.

The addition amount of the foaming agent based on 100 parts by mass of the multilayer resin particles is preferably 0.1 to 30 parts by mass, more preferably 0.5 to 15 parts by mass.

As a method of impregnating the multilayer resin particles with the foaming agent in the production process of the expanded beads, a method of dispersing the multilayer resin particles in an aqueous dispersion medium in a sealed container, injecting the foaming agent while heating, and impregnating the multilayer resin particles with the foaming agent is preferably used.

The internal pressure of the sealed container at the time of foaming is preferably 0.5 MPa (G: gauge pressure) or more. On the other hand, the internal pressure of the sealed container is preferably 4.0 MPa (G) or less. Within the above range, expanded beads can be produced safely without the risk of breakage, explosion, or the like of the sealed container.

By raising the temperature of the aqueous dispersion medium in the expanded bead production process at 1 to 5° C./min, the temperature at the time of foaming can also be adjusted to an appropriate range.

Expanded beads having a crystal structure that shows a melting peak (resin specific peak) specific to a resin and one or more melting peaks (high-temperature peaks) on a high temperature side thereof in a DSC curve obtained by DSC are obtained, for example, as follows.

At the time of heating in the expanded bead production process, a one-step holding step of holding at a temperature of (the melting point of the polypropylene-based resin−20° C.) or higher and lower than (the melting end temperature of the polypropylene-based resin) for a sufficient time, preferably about 10 to 60 minutes, is performed. Thereafter, the temperature is adjusted to a temperature of (the melting point of the polypropylene-based resin−15° C.) to (the melting end temperature of the polypropylene-based resin+10° C.). Then, if necessary, a two-step holding step of further holding at that temperature for a sufficient time, preferably about 10 to 60 minutes, is performed. Next, by releasing the expandable resin particles containing the foaming agent from the inside of the sealed container to a low pressure and expanding the expandable resin particles, expanded beads having the above-described crystal structure can be obtained. The expansion is preferably performed in the sealed container at (the melting point of the polypropylene-based resin−10° C.) or higher, more preferably at (the melting point of the polypropylene-based resin) or higher and (the melting point of the polypropylene-based resin+20° C.) or lower.

In addition, in the production of expanded beads having a particularly low apparent density, it is possible to perform two-step expansion in which expanded beads are charged into a pressurizable sealed container, pressurized gas such as air is injected into the container to increase the internal pressure of the expanded beads, and the expanded beads are heated in the container using a heating medium such as steam for a predetermined time to obtain expanded beads having a particularly low apparent density.

Production of Molded Article

The molded article can be obtained by in-mold molding of expanded beads (that is, the in-mold molding method). The in-mold molding method is performed by filling expanded beads in a molding mold and heat-molding the expanded beads using a heating medium such as steam. Specifically, after the expanded beads are filled in the molding mold, a heating medium such as steam is introduced into the molding mold, whereby the expanded beads are heated to be secondarily expanded and are fusion-bonded to each other to provide a molded article shaped into the shape of the molding space.

Molded Article

The molded article is formed by, for example, in-mold molding of expanded beads and is composed of a large number of expanded beads fused to each other. The molded article has interconnected voids. The interconnected voids of the molded article are formed by complicated connection of voids formed by connecting through holes of a plurality of expanded beads, voids formed by connecting through holes of expanded beads with voids formed between the expanded beads, voids formed by connecting voids between the expanded beads, and the like.

The voidage of the molded article is preferably 15% or less, is more preferably 12% or less, and still more preferably 10% or less from the viewpoint of improvement in appearance and mechanical physical properties. In addition, from the viewpoint of more easily suppressing significant shrinkage and deformation of the molded article when the aging step is omitted, the voidage of the molded article is preferably 4% or more, more preferably 5% or more.

The voidage of the molded article can be determined as follows. First, a test piece having a rectangular parallelepiped shape (20 mm in length x 100 mm in width x 20 mm in height) is cut out from the central portion of the molded article. Then, the test piece is immersed in ethanol contained in a measuring cylinder, and a true volume Vc [L] of the test piece is determined from the increase in the liquid level of ethanol. In addition, an apparent volume Vd [L] is determined from the outer dimensions of the test piece. The voidage of the molded article can be determined from the determined true volume Vc and the apparent volume Vd by Formula (2) below.

$$\text{Voidage (\%)}=[(Vd-Vc)/Vd]\times 100 \qquad (2)$$

The density of the molded article is preferably 10 kg/m$^3$ or more and 100 kg/m$^3$ or less, more preferably 15 kg/m$^3$ or more and 80 kg/m$^3$ or less, still more preferably 20 kg/m$^3$ or more and 50 kg/m$^3$ or less, particularly preferably 25 kg/m$^3$ or more and 45 kg/m$^3$ or less, from the viewpoint of the balance between a lightweight property and rigidity. When the apparent density of a conventional molded article is small, the molded article is significantly shrunk and deformed easily after being demolded, and therefore, it has been necessary to recover the dimensions of the molded article by providing a aging step. The molded article in the present disclosure has stable dimensions without providing a aging step even when the apparent density is small.

The density of the molded article is calculated by dividing the weight (g) of the molded article by the volume (L) which is determined from the outside dimension of the molded article and performing unit conversion. It is noted that when the volume cannot be determined easily from the outside dimension of the molded article, the volume of the molded article can be determined with a submersion method.

The expanded beads are excellent in moldability from a low molding heating temperature (that is, a low molding pressure) to a high molding heating temperature (that is, a high molding pressure), and a molded article excellent in appearance and rigidity is obtained, so that the moldable temperature range (that is, the molding pressure range) for obtaining a good molded article is widened. Furthermore, even when the pre-pressurization of the expanded beads and the aging step after molding are omitted, that is, even when molding is performed without pressurization or aging, molding can be performed in a wide molding pressure range as described above, and a molded article having good appearance and excellent mechanical strength such as rigidity can be obtained, so that the producibility of the molded article of expanded beads can be significantly improved.

The molded article is also used as a sound absorbing material, an impact absorbing material, a cushioning material, and the like in various fields such as a vehicle field such as an automobile and a construction field.

EXAMPLES

Next, the present invention will be described in more detail with reference to examples, but the present invention is not limited by these examples at all.

The following measurements and evaluations were performed on resins, expanded beads, and molded articles used in examples and comparative examples. The evaluations of the expanded beads were performed after the expanded beads were conditioned by allowing the expanded beads to stand for 24 hours under the conditions of a relative humidity of 50%, 23° C., and 1 atm.

Polypropylene-Based Resin

Table 1 shows the properties and the like of polypropylene-based resins used for producing expanded beads. An ethylene-propylene copolymer and an ethylene-propylene-butene copolymer used in this example were both random copolymers. The density of the polypropylene-based resins used in this example is 900 kg/m³.

ene/ethylene copolymer", 618 to 619 "II. 2.3 2.3.5 Propylene/butene copolymer"), that is, a method of performing quantification using the relationship between the absorbances of ethylene and butene corrected with a predetermined coefficient and the thickness of the film-shaped test piece and the like. More specifically, first, the polypropylene-based resin was hot-pressed in an environment at 180° C. to be formed into a film, thereby providing a plurality of test pieces having different thicknesses. Next, absorbances ($A_{722}$ and $A_{733}$) at 722 cm$^{-1}$ and 733 cm$^{-1}$ derived from ethylene and an absorbance ($A_{766}$) at 766 cm$^{-1}$ derived from butene were read by measuring an IR spectrum of each test piece. Next, for each test piece, the ethylene component content in the polypropylene-based resin was calculated using Formulas (3) to (5) below. The value obtained by arithmetically averaging the ethylene component contents obtained for each test piece was taken as the ethylene component content (unit: wt %) in the polypropylene-based resin.

$$(K'_{733})_c = 1/0.96\{(K'_{733})_a - 0.268(K'_{722})_a\} \quad (3)$$

$$(K'_{722})_c = 1/0.96\{(K'_{722})_a - 0.268(K'_{722})_a\} \quad (4)$$

$$\text{Ethylene component content (\%)} = 0.575\{(K'_{722})_c + (K'_{733})_c\} \quad (5)$$

In Formulas (3) to (5), $K'_a$ represents an apparent absorption coefficient at each wave number ($K'_a = A/\rho t$), $K'_c$ represents a corrected absorption coefficient, A represents an absorbance, $\rho$ represents a density of the resin (unit: g/cm³), and t represents the thickness of the film-like test piece (unit: cm). Formulas (3) to (5) above can be applied to random copolymers.

Also, for each test piece, the butene component content in the polypropylene-based resin was calculated using Formula (6) below. The value obtained by arithmetically averaging

TABLE 1

| Reference Numeral | Material | Catalyst | Comonomer Species and Content | Flexural Modulus MPA | Melting Point (° C.) | Crystallization Temperature (° C.) | MFR (g/10 min) |
| --- | --- | --- | --- | --- | --- | --- | --- |
| PP1 | Ethylene-propylene Random Copolymer | Ziegler-Natta | Ethylene 1.4 mass % | 1470 | 153 | 113 | 7 |
| PP2 | Ethylene-propylene Random Copolymer | Ziegler-Natta | Ethylene 3.1 mass % | 980 | 142 | 104 | 8 |
| PP3 | Polypropylene (Homopolymer) | Ziegler-Natta | — | 1650 | 162 | 118 | 10 |
| PP4 | Mixed Resin of PP1 (80 mass %) and PP2 (20 mass %) | — | Ethylene 1.7 mass % | 1350 | 152 | 112 | 7 |
| PP5 | Mixed Resin of PP1 (95 mass %) and PP2 (5 mass %) | — | Ethylene 1.5 mass % | 1440 | 152 | 112 | 7 |
| PP6 | Ethylene-propylene Random Copolymer | Ziegler-Natta | Ethylene 3.1 mass % and Butene 3.8 mass % | 650 | 133 | 92 | 6 |

Monomer Component Contents in Polypropylene-Based Resin

The monomer component contents of each polypropylene-based resin (specifically the ethylene-propylene copolymer and the ethylene-propylene-butene copolymer) were determined by a known method using an IR spectrum. Specifically, determination was performed by the method described in Polymer Analysis Handbook (edited by Research Committee of Polymer Analysis, The Japan Society for Analytical Chemistry, publication date: January 1995, publishing company: Kinokuniya Company Ltd., page number and item name: 615 and 616 "II. 2.3 2.3.4 Propylthe butene component contents obtained for each test piece was taken as the butene component content (%) in the polypropylene-based resin.

$$\text{Butene component content (\%)} = 12.3(A_{766}/L) \quad (6)$$

In Formula (6), A represents an absorbance, and L represents the thickness (mm) of the film-like test piece.

Melting Point of Polypropylene-Based Resin

The melting point of the polypropylene-based resin was determined in accordance with JIS K 7121:1987. Specifically, "(2) When the melting temperature is measured after a certain heat treatment" was adopted for conditioning, a DSC curve was obtained by raising the temperature of a conditioned test piece from 30° C. to 200° C. at a heating rate of 10° C./min, and the peak temperature of the melting peak was regarded as the melting point. As the measuring device, a heat flux differential scanning calorimeter (manufactured by SII NanoTechnology Inc., model number: DSC7020) was used.

Melt Flow Rate of Polypropylene-Based Resin

The melt flow rate (that is, the MFR) of the polypropylene-based resin was measured under the conditions of a temperature of 230° C. and a load of 2.16 kg in accordance with JIS K 7210-1:2014.

Flexural Modulus of Polypropylene-Based Resin

The polypropylene-based resin was heat-pressed at 230° C. to prepare a 4-mm sheet, and a test piece having a length of 80 mm×a width of 10 mm×a thickness of 4 mm was cut out from the sheet. The flexural modulus of this test piece was determined in accordance with JIS K 7171:2008. A radius R1 of an indenter and a radius R2 of a support base are both 5 mm, the distance between the support points is 64 mm, and the test speed is 2 ram/min.

Crystallization Temperature of Polypropylene-Based Resin

In accordance with JIS K 7121:2012, the polypropylene-based resin is heated from 23° C. to 200° C. at a heating rate of 10° C./min and then cooled from 200° C. to 30° C. at a cooling rate of 10° C./min using a heat flux differential scanning calorimeter (manufactured by SII NanoTechnology Inc., model number: DSC7020) to obtain a DSC curve. The peak temperature of the crystallization peak in this DSC curve was regarded as the crystallization temperature. When a plurality of crystallization peaks appeared in the DSC curve, the peak temperature of the crystallization peak having the highest peak height was defined as the crystallization temperature.

Multilayer Resin Particles and Expanded Beads

Tables 2 to 5 show the properties and the like of multilayer resin particles and expanded beads.

TABLE 2

| | | | Example No. | | | | | | | |
|---|---|---|---|---|---|---|---|---|---|---|
| | | | Example 1 | Example 2 | Example 3 | Example 4 | Example 5 | Example 6 | Example 7 | Example 8 |
| | | | | | | Expanded Beads | | | | |
| | | | Expanded Beads A | Expanded Beads B | Expanded Beads D | Expanded Beads J | Expanded Beads K | Expanded Beads L | | |
| Multilayer Resin Particles | Core Layer | Type of Resin | — | PP1 | PP1 | PP4 | PP5 | PP1 | PP1 | |
| | Covering Layer | Type of Resin | — | PP6 | PP6 | PP6 | PP6 | PP6 | PP6 | |
| | Ratio of Covering Layer in Particle | % | | 5 | 5 | 5 | 5 | 5 | 5 | |
| | Mass of Resin Particles | mg | | 1.5 | 1.5 | 1.5 | 1.5 | 1.5 | 1.5 | |
| | Length | mm | | 2 | 2 | 2 | 2 | 2 | 2 | |
| | Average Hole Diameter dr | mm | | 0.21 | 0.21 | 0.21 | 0.21 | 0.21 | 0.21 | |
| | Average Outer Diameter Dr | mm | | 1.15 | 1.15 | 1.15 | 1.15 | 1.15 | 1.15 | |
| | dr/Dr | — | | 0.18 | 0.18 | 0.18 | 0.18 | 0.18 | 0.18 | |
| One-step Expansion Step | Foaming Temperature | ° C. | | 157.2 | 157.9 | 156.7 | 157.0 | 159.1 | 157.2 | |
| | Foaming Agent Impregnation Pressure | MPa(G) | | 3.7 | 3.5 | 3.7 | 3.7 | 2.2 | 3.8 | |
| One-step Expanded Beads | Bulk Ratio | Times | | 40.0 | 37.5 | 40.0 | 39.1 | 17.7 | 35.7 | |
| Two-step Expansion Step | Internal Pressure | MPa(G) | | — | — | — | — | — | — | |
| | Steam Pressure at Heating | MPa(G) | | — | — | — | — | — | — | |

TABLE 3

| | | | Example No. | | | | | | | |
|---|---|---|---|---|---|---|---|---|---|---|
| | | | Example 1 | Example 2 | Example 3 | Example 4 | Example 5 | Example 6 | Example 7 | Example 8 |
| | | | | | | Expanded Beads | | | | |
| | | | Expanded Beads A | Expanded Beads B | Expanded Beads D | Expanded Beads J | Expanded Beads K | Expanded Beads L | | |
| Expanded Beads | Bulk Ratio | Times | | 40.0 | 37.5 | 40.0 | 39.1 | 17.7 | 35.7 | |
| | Bulk Density | kg/m³ | | 22.5 | 24.0 | 22.5 | 23.0 | 50.8 | 25.2 | |
| | Apparent Density | kg/m³ | | 38.5 | 42.6 | 39.2 | 39.8 | 89.0 | 44.9 | |
| | Apparent Density/Bulk Density | — | | 1.71 | 1.78 | 1.74 | 1.73 | 1.75 | 1.78 | |
| | Closed Cell Content | % | | 97 | 91 | 96 | 97 | 97 | 85 | |
| | Heat of Fusion of High-temperature Peak | J/g | | 15.4 | 11.9 | 15.0 | 15.4 | 15.2 | 16.1 | |
| | Average hole Diameter d of Through Holes | mm | | 0.94 | 0.91 | 0.93 | 0.93 | 0.42 | 0.78 | |
| | Average Outer Diameter D | mm | | 3.92 | 4.11 | 3.91 | 3.88 | 3.02 | 3.67 | |

TABLE 3-continued

| | | | Example No. | | | | | | |
|---|---|---|---|---|---|---|---|---|---|
| | | | Example 1 | Example 2 | Example 3 | Example 4 | Example 5 | Example 6 | Example 7 | Example 8 |
| | | | | | | Expanded Beads | | | | |
| | | | Expanded Beads A | | | Expanded Beads B | Expanded Beads D | Expanded Beads J | Expanded Beads K | Expanded Beads L |
| Average Wall Thickness t | mm | 1.49 | | | 1.80 | 1.49 | 1.48 | 1.30 | 1.45 |
| d/D | — | 0.24 | | | 0.22 | 0.24 | 0.24 | 0.14 | 0.21 |
| L/D | — | 0.96 | | | 0.79 | 0.95 | 0.95 | 0.98 | 0.96 |
| t/D | — | 0.38 | | | 0.39 | 0.36 | 0.38 | 0.43 | 0.39 |
| Moldable Range without Pressurization or Aging | MPa(G) | 0.22~0.34 | | | 0.22~0.34 | 0.22~0.32 | 0.22~0.34 | 0.22~0.34 | 0.22~0.34 |

TABLE 4

| | | | | Comparative Example No. | | | | |
|---|---|---|---|---|---|---|---|---|
| | | | | Comparative Example 1 | Comparative Example 2 | Comparative Example 3 | Comparative Example 4 | Comparative Example 5 | Comparative Example 6 |
| | | | | | | Expanded Beads | | | |
| | | | | Expanded Beads E | | Expanded Beads F | Expanded Beads G | Expanded Beads H | Expanded Beads I |
| Multilayer Resin Particles | Core Layer | Type of Resin | — | PP1 | | PP1 | PP2 | PP3 | PP1 |
| | Covering Layer | Type of Resin | — | PP6 | | PP6 | PP6 | PP6 | — |
| | Ratio of Covering Layer in Particle | | % | 5 | | 5 | 5 | 5 | — |
| | Mass of Resin Particles | | mg | 1.5 | | 1.5 | 1.5 | 1.5 | 1.5 |
| | Length | | mm | 2 | | 2 | 2 | 2 | 2 |
| | Average Hole Diameter dr | | mm | 0.56 | | — | 0.20 | 0.21 | 0.21 |
| | Average Outer Diameter Dr | | mm | 1.21 | | — | 1.16 | 1.15 | 1.15 |
| | dr/Dr | | — | 0.47 | | — | 0.17 | 0.18 | 0.18 |
| One-step Expansion Step | Foaming Temperature | | °C. | 156.1 | | 159.2 | 150.1 | 165.5 | 157.2 |
| | Foaming Agent Impregnation Pressure | | | 3.1 | | 2.2 | 2.6 | 4.3 | 3.7 |
| One-step Expanded Beads | Bulk Ratio | | Times | 36.0 | | 17.8 | 19.1 | 34.6 | 41.5 |
| Two-step Expansion Step | Internal Pressure | | MPa(G) | — | | 0.5 | 0.5 | — | — |
| | Steam Pressure at Heating | | MPa(G) | — | | 0.38 | 0.35 | — | — |

TABLE 5

| | | | | Comparative Example No. | | | | |
|---|---|---|---|---|---|---|---|---|
| | | | | Comparative Example 1 | Comparative Example 2 | Comparative Example 3 | Comparative Example 4 | Comparative Example 5 | Comparative Example 6 |
| | | | | | | Expanded Beads | | | |
| | | | | Expanded Beads E | | Expanded Beads F | Expanded Beads G | Expanded Beads H | Expanded Beads I |
| Expanded Beads | Bulk Ratio | Times | | 36.0 | | 37.5 | 37.5 | 34.6 | 41.5 |
| | Bulk Density | kg/m³ | | 25.0 | | 24.0 | 24.0 | 26.0 | 21.7 |
| | Apparent Density | kg/m³ | | 51.3 | | 38.5 | 42.5 | 45.5 | 37.0 |
| | Apparent Density/Bulk Density | — | | 2.05 | | 1.60 | 1.78 | 1.75 | 1.71 |
| | Closed Cell Content | % | | 96 | | 99 | 98 | 96 | 97 |
| | Heat of Fusion of High-temperature Peak | J/g | | 16.0 | | 14.1 | 14.5 | 27.2 | 14.9 |
| | Average hole Diameter d of Through Holes | mm | | 1.55 | | — | 0.70 | 0.80 | 0.92 |
| | Average Outer Diameter D | mm | | 3.56 | | 3.71 | 3.69 | 3.30 | 4.01 |
| | Average Wall Thickness t | mm | | 1.00 | | — | 1.49 | 1.25 | 1.53 |

TABLE 5-continued

| | | Comparative Example No. | | | | | |
|---|---|---|---|---|---|---|---|
| | | Comparative Example 1 | Comparative Example 2 | Comparative Example 3 | Comparative Example 4 | Comparative Example 5 | Comparative Example 6 |
| | | | | Expanded Beads | | | |
| | | | Expanded Beads E | Expanded Beads F | Expanded Beads G | Expanded Beads H | Expanded Beads I |
| d/D | — | | 0.44 | — | 0.19 | 0.24 | 0.23 |
| L/D | — | | 1.16 | 1.06 | 1.08 | 1.01 | 0.94 |
| t/D | — | | 0.28 | — | 0.40 | 0.38 | 0.36 |
| Moldable Range without Pressurization or Aging | MPa(G) | | 0.26~0.34 | 0.28~0.32 | 0.22 | 0.32~0.36 | 0.34~0.36 |

Length of Multilayer Resin Particles

The length of the multilayer resin particles was determined as follows. The maximum lengths of 100 multilayer resin particles randomly selected from a group of multilayer resin particles were measured with a vernier caliper, and the arithmetic average value thereof was taken as the length of the multilayer resin particles.

Average Hole Diameter Dr of Through Holes of Multilayer Resin Particles

The average hole diameter of the through holes of the multilayer resin particles was determined as follows. At positions where the areas of cut surfaces were maximum, 100 multilayer resin particles randomly selected from a group of multilayer resin particles were cut perpendicularly to the penetration direction of the through holes. The cut surface of each multilayer resin particle was photographed, and the cross-sectional area (opening area) of the through hole portion in the cross-sectional photograph was determined. The diameter of a virtual perfect circle having the same area as the cross-sectional area was calculated, and the arithmetic average thereof was taken as the average hole diameter (dr) of the through holes of the multilayer resin particles.

Average Outer Diameter Dr of Multilayer Resin Particles

The average outer diameter of the multilayer resin particles was determined as follows. At positions where the areas of cut surfaces were maximum, 100 multilayer resin particles randomly selected from a group of multilayer resin particles were cut perpendicularly to the penetration direction of the through holes. The cut surface of each multilayer resin particle was photographed to determine the cross-sectional area (including the opening of the through hole) of the multilayer resin particle. The diameter of a virtual perfect circle having the same area as the cross-sectional area was calculated, and the arithmetic average thereof was taken as the average outer diameter (Dr) of the multilayer resin particles.

Average Hole Diameter d of Through Holes of Expanded Beads

The average hole diameter of the through holes of the expanded beads was determined as follows. At positions where the areas of cut surfaces were maximum, 100 expanded beads randomly selected from a group of expanded beads after conditioning were cut perpendicularly to the penetration direction of the through holes. The cut surface of each expanded bead was photographed, and the cross-sectional area (opening area) of the through hole portion in the cross-sectional photograph was determined. The diameter of a virtual perfect circle having the same area as the cross-sectional area was calculated, and the arithmetic average thereof was taken as the average hole diameter (d) of the through holes of the expanded beads.

Average Outer Diameter D of Expanded Beads

The average outer diameter of the expanded beads was determined as follows. At positions where the areas of cut surfaces were maximum, 100 expanded beads randomly selected from a group of expanded beads after conditioning were cut perpendicularly to the penetration direction of the through holes. The cut surface of each expanded bead was photographed to determine the cross-sectional area (including the opening of the through hole) of the expanded bead. The diameter of a virtual perfect circle having the same area as the cross-sectional area was calculated, and the arithmetic average thereof was taken as the average outer diameter (D) of the expanded beads.

Average Wall Thickness t

The average wall thickness of the expanded beads was determined by Formula (7) below.

$$\text{Average wall thickness } t = (\text{average outer diameter } D - \text{average hole diameter } d)/2 \tag{7}$$

Aspect Ratio L/D

For 100 expanded beads before the average outer diameter D of the expanded beads and the average hole diameter d of the through holes were measured, the maximum lengths in the penetration direction of the through holes were measured with a vernier caliper, these lengths were arithmetically averaged to determine the average length L of the expanded beads, and the average length L was divided by the average outer diameter D to determine the average aspect ratio L/D of the expanded beads.

Apparent Density

The apparent density of the expanded beads was determined as follows. First, a measuring cylinder containing ethanol at a temperature of 23° C. was provided, and an arbitrary amount of a group of expanded beads (mass W1 [g] of a group of expanded beads) after conditioning was immersed in ethanol in the measuring cylinder using a wire mesh. Then, in consideration of the volume of the wire mesh, a volume V1 [L] of the group of expanded beads read from the liquid level rise was measured. The apparent density of the expanded beads was determined by dividing the mass W1 [g] by the volume V1 [L] (W1/V1) of the group of expanded beads placed in the measuring cylinder and converting the unit to [kg/m$^3$].

Bulk Density

The bulk density of the expanded beads was determined as follows. Expanded beads were randomly taken out from a group of expanded beads after conditioning and placed in a measuring cylinder having a capacity of 1 L, a large number of the expanded beads were accommodated up to a scale of 1 L so as to be in a natural deposition state, a mass W2 [g] of the accommodated expanded beads was divided by an accommodation volume V2 (1 L) (W2/V2), and the unit is converted to [kg/m³], whereby the bulk density of the expanded beads was determined.

Bulk Ratio

The bulk ratio [times] of the expanded beads was determined as follows. The density [kg/m³] of the resin composing the foamed core layer was divided by the bulk density [kg/m³].

Heat of Fusion of Each Peak in DSC Curve of Expanded Bead

Figure 3:
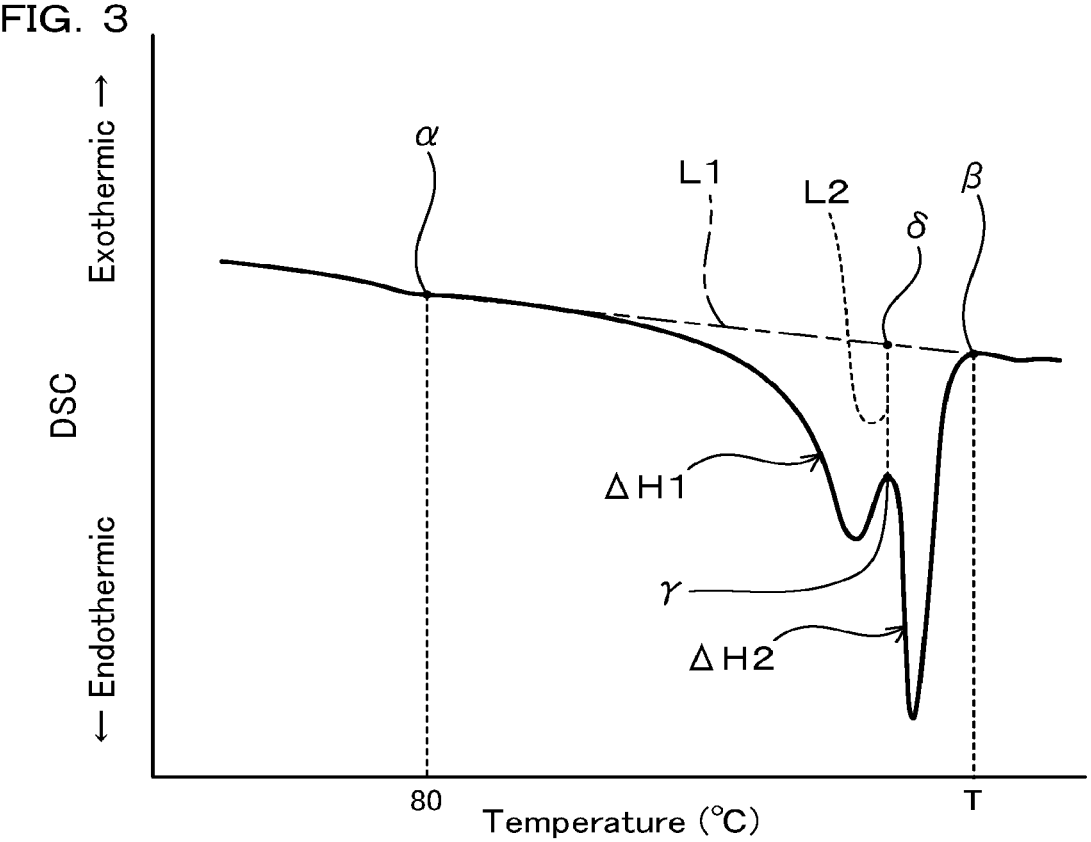
FIG. 3 is an explanatory diagram illustrating a method for calculating an area of a high-temperature peak.

One expanded bead was collected from a group of expanded beads after conditioning. Using the expanded bead as a test piece, a DSC curve was obtained when the test piece was heated from 23° C. to 200° C. at a heating rate of 10° C./min with a differential scanning calorimeter (specifically DSC Q1000 manufactured by TA Instruments). FIG. 3 shows an example of the DSC curve. As exemplified in FIG. 3, in the DSC curve, a resin specific peak ΔH1 and a high-temperature peak ΔH2 having a peak on a higher temperature side than the peak of the resin specific peak ΔH1 appear.

Next, a point α at a temperature of 80° C. and a point β at a melting end temperature T of the expanded bead on the DSC curve were connected to provide a straight line L1. Next, a straight line L2 parallel to the vertical axis of the graph was drawn from a point γ on the DSC curve corresponding to the valley between the resin specific peak ΔH1 and the high-temperature peak ΔH2, and the point at which the straight line L1 and the straight line L2 intersect was defined as δ. The point γ can also be said to be a maximum point existing between the resin specific peak ΔH1 and the high-temperature peak ΔH2.

The area of the resin specific peak ΔH1 was the area of a portion surrounded by the curve of the resin specific peak ΔH1 portion of the DSC curve, the line segment α-δ, and the line segment γ-δ, and this area was taken as the heat of fusion of the resin specific peak.

The area of the high-temperature peak ΔH2 was the area of a portion surrounded by the curve of the high-temperature peak ΔH2 portion of the DSC curve, the line segment δ-β, and the line segment γ-δ, and this area was taken as the heat of fusion of the high-temperature peak.

The area of the entire melting peaks was the area of a portion surrounded by the curve of the resin specific peak ΔH1 portion and the curve of the high-temperature peak ΔH2 portion of the DSC curve and the line segment α-β (that is, the straight line L1), and this area was taken as the heat of fusion of the entire melting peaks.

The above measurement was performed on five expanded beads, and Tables 3 and 5 show the arithmetic average values.

Closed Cell Content of Expanded Bead

The closed cell content of the expanded beads was measured using an air-comparison pycnometer in accordance with ASTM D 2856 70. Specifically, determination was performed as follows. Using expanded beads having a bulk volume of about 20 cm³ after conditioning as a measurement sample, an apparent volume Va was accurately measured by an ethanol immersion method as described below. The measurement sample whose apparent volume Va was measured was sufficiently dried, and then, according to Procedure C described in ASTM D 2856 70, a true volume value Vx of the measurement sample was measured with "Air Comparison Pycnometer 930" manufactured by Toshiba Beckman Co., Ltd. On the basis of these volume values Va and Vx, the closed cell content was calculated by Formula (8) below, and the average value of five samples (N=5) was taken as the closed cell content of the expanded beads.

$$\text{Closed cell content (\%)} = (Vx - W/\rho) \times 100/(Va - W/\rho) \quad (8)$$

In the formula,

Vx represents the true volume of the expanded beads measured by the above method, that is, the sum (cm³) of the volume of the resin composing the expanded beads and the total volume of the closed cell portions in the expanded beads, Va represents the apparent volume (cm³) of the expanded beads measured from an increase in liquid level when the expanded beads are immersed in ethanol contained in a measuring cylinder, W represents the weight (g) of the sample for measurement of expanded beads, and ρ represents the density of the resin composing the expanded beads (g/cm³).

Moldable Range without Pressurization or Aging

The moldable range without pressurization or aging was evaluated by examining a molding pressure range in which a good molded article of expanded beads can be molded without performing pre-pressurization or aging steps. Specifically, first, molded articles were molded by changing the molding steam pressure by 0.02 MPa between 0.20 and 0.36 MPa (G) by a method described later in the "Production of molded article" section. The demolded molded articles were allowed to stand under the conditions of a relative humidity of 50%, 23° C., and 1 atm for 24 hours, and then the fusion-bonding property, recoverability, and surface property (that is, the appearance) were evaluated as described later, and the range of the molding steam pressure in which molded articles showing evaluation results of fusion-bonding property and recoverability of "A" were obtained was measured. The wider the range from the lower limit value to the upper limit value of the moldable steam pressure, the wider the moldable heating temperature range.

Molded Article

Tables 6 and 7 show the molding conditions, properties, and the like of molded articles. In addition, Tables 8 and 9 show the evaluation results obtained in the evaluation of the moldable range without pressurization or aging mentioned above with respect to the fusion-bonding property, recoverability, and surface property (that is, the appearance) of the molded article molded at each molding steam pressure.

TABLE 6

| | | | Example No. | | | | | | | |
|---|---|---|---|---|---|---|---|---|---|---|
| | | | Example 1 | Example 2 | Example 3 | Example 4 | Example 5 | Example 6 | Example 7 | Example 8 |
| Molded Article | Internal Pressure of Expanded Beads | MPa(G) | — | — | — | — | — | — | | |

TABLE 6-continued

| | | | Example No. | | | | | | | |
|---|---|---|---|---|---|---|---|---|---|---|
| | | | Example 1 | Example 2 | Example 3 | Example 4 | Example 5 | Example 6 | Example 7 | Example 8 |
| (molding conditions) | Cracking Width | % | 20 | 20 | 10 | 20 | 20 | 20 | 20 | 20 |
| | Molding Pressure | MPa(G) | 0.22 | 0.34 | 0.22 | 0.22 | 0.22 | 0.22 | 0.22 | 0.22 |
| | Water Cooling Time | sec | 0 | 17 | 0 | 2 | 0 | 0 | 0 | 0 |
| Molded Article (physical properties, evaluation) | Density of Molded Article | kg/m² | 32 | 32 | 27 | 33 | 32 | 32 | 69 | 33 |
| | Shrinking Percentage | % | 2.0 | 2.0 | 2.3 | 2.0 | 2.0 | 2.0 | 2.0 | 2.0 |
| | 50% compressive stress | kPa | 257 | 255 | 232 | 261 | 248 | 261 | 680 | 262 |
| | Density of Cut Molded Article | kg/m³ | 30.4 | 28.8 | 26.8 | 32.6 | 30.2 | 31.0 | 67.0 | 32.7 |
| | Voidage of Molded Article | % | 12 | 6.8 | 8.6 | 7.4 | 13 | 12 | 11 | 12 |
| | Evaluation of Surface Property in Molded Article | — | A | A | A | A | A | A | A | A |
| | Drying Cycle | — | Good | Good | Good | Good | Good | Good | Good | Good |

TABLE 7

| | | | Comparative Example No. | | | | | |
|---|---|---|---|---|---|---|---|---|
| | | | Comparative Example 1 | Comparative Example 2 | Comparative Example 3 | Comparative Example 4 | Comparative Example 5 | Comparative Example 6 |
| Molded Article (molding conditions) | Internal Pressure of Expanded Beads | MPa(G) | — | — | — | — | — | — |
| | Cracking Width | % | 20 | 20 | 20 | 20 | 20 | 20 |
| | Molding Pressure | MPa(G) | 0.26 | 0.34 | 0.28 | 0.22 | 0.32 | 0.34 |
| | Water Cooling Time | sec | 0 | 0 | 0 | 0 | 0 | 19 |
| Molded Article (physical properties, evaluation) | Density of Molded Article | kg/m² | 31 | 31 | 31 | 34 | 31 | 31 |
| | Shrinking Percentage | % | 2.6 | 2.6 | 2.1 | 2.3 | 1.8 | 1.8 |
| | 50% compressive stress | kPa | 207 | 217 | 252 | 239 | 246 | 266 |
| | Density of Cut Molded Article | kg/m³ | 30.1 | 29.8 | 29.6 | 33.4 | 29.7 | 29.8 |
| | Voidage of Molded Article | % | 21 | 17 | — | 12 | 12 | 5.6 |
| | Evaluation of Surface Property in Molded Article | — | C | C | A | A | A | A |
| | Drying Cycle | — | Poor | Poor | Good | Good | Good | Good |

TABLE 8

| Steam Pressure for Molding [MPa(G)] | Examples 1 through 3 Expanded Beads A | | | Example 4 Expanded Beads B | | | Example 5 Expanded Beads D | | | Example 6 Expanded Beads J | | | Example 7 Expanded Beads K | | |
|---|---|---|---|---|---|---|---|---|---|---|---|---|---|---|---|
| | Fusion-bonding Property | Recoverability | Appearance Surface Property | Fusion-bonding Property | Recoverability | Appearance Surface Property | Fusion-bonding Property | Recoverability | Appearance Surface Property | Fusion-bonding Property | Recoverability | Appearance Surface Property | Fusion-bonding Property | Recoverability | Appearance Surface Property |
| 0.20 | B | A | A | B | A | A | B | A | A | B | A | A | B | A | A |
| 0.22 | A | A | A | A | A | A | A | A | A | A | A | A | A | A | A |
| 0.24 | A | A | A | A | A | A | A | A | A | A | A | A | A | A | A |
| 0.26 | A | A | A | A | A | A | A | A | A | A | A | A | A | A | A |
| 0.28 | A | A | A | A | A | A | A | A | A | A | A | A | A | A | A |
| 0.30 | A | A | A | A | A | A | A | A | A | A | A | A | A | A | A |
| 0.32 | A | A | A | A | A | A | A | A | A | A | A | A | A | A | A |
| 0.34 | A | A | A | A | A | A | A | A | A | A | A | A | A | A | A |
| 0.36 | A | B | A | A | B | A | A | B | A | A | B | A | A | B | A |

| Steam Pressure for Molding [MPa(G)] | Example 7 Expanded Beads K | | |
|---|---|---|---|
| | Fusion-bonding Property | Recoverability | Appearance Surface Property |
| 0.20 | B | A | A |
| 0.22 | A | A | A |
| 0.24 | A | A | A |
| 0.26 | A | A | A |

TABLE 8-continued

| | | | | |
|---|---|---|---|---|
| | 0.28 | A | A | A |
| | 0.30 | A | A | A |
| | 0.32 | A | A | A |
| | 0.34 | A | A | A |
| | 0.36 | A | B | A |

TABLE 9

| Steam Pressure for Molding [MPa (G)] | Comparative Examples 1 and 2 Expanded Beads E | | | Comparative Examples 3 Expanded Beads F | | | Comparative Examples 4 Expanded Beads G | | | Comparative Examples 5 Expanded Beads H | | | Comparative Examples 6 Expanded Beads I | | |
|---|---|---|---|---|---|---|---|---|---|---|---|---|---|---|---|
| | Fusion-bonding Property | Recoverability | Appearance Surface Property | Fusion-bonding Property | Recoverability | Appearance Surface Property | Fusion-bonding Property | Recoverability | Appearance Surface Property | Fusion-bonding Property | Recoverability | Appearance Surface Property | Fusion-bonding Property | Recoverability | Appearance Surface Property |
| 0.20 | B | A | C | B | A | A | B | A | A | B | A | A | B | A | A |
| 0.22 | B | A | C | B | A | A | A | A | A | B | A | A | B | A | A |
| 0.24 | B | A | C | B | A | A | A | B | A | B | A | A | B | A | A |
| 0.26 | A | A | C | B | A | A | A | C | A | B | A | A | B | A | A |
| 0.28 | A | A | C | A | A | A | A | C | A | B | A | A | B | A | A |
| 0.30 | A | A | C | A | A | A | A | C | A | B | A | A | B | A | A |
| 0.32 | A | A | C | A | A | A | Not Evaluated | | | A | A | A | B | A | A |
| 0.34 | A | A | C | A | B | A | | | | A | A | A | A | A | A |
| 0.36 | A | B | C | A | C | A | | | | A | A | A | A | A | A |

Fusion-Bonding Property

The molded article was bent and broken, the total number C1 of expanded beads present on the fracture surface and the number C2 of expanded beads broken (suffered from material failure) in itself were determined, and the ratio of the number C2 of the expanded beads suffered from material failure to the total number C1 of the expanded beads (that is, the material fracture rate) was calculated. The material fracture rate is calculated from the formula $C2/C1 \times 100$. The above measurement was performed five times using different test pieces, and the respective material fracture rates were obtained. The case where the arithmetic average value of the material fracture rate was 90° or more was evaluated as "A", the case of 70° or more and less than 90° was evaluated as "B", and the case of less than 70° was evaluated as "C".

Recoverability

The thickness of a molded article, which had been obtained using a flat plate-shaped mold having a length of 300 mm, a width of 250 mm, and a thickness of 60 mm, was measured at four portions in the vicinities of its four corners (specifically at a position 10 mm inside from each corner toward the center) and at a central portion (at a position divided equally in length and width directions). Next, the ratio (unit: %) of the thickness of the central portion to the thickness of the thickest portion among the four portions was calculated, and the case where the ratio was 95% or more was evaluated as "A", the case of 90% or more and less than 95% was evaluated as "B", and the case of less than 90% was evaluated as "C".

Surface Property (that is, Appearance)

The appearance was evaluated by evaluating the surface property of the molded article. Specifically, evaluation was performed on the basis of the following criteria.

A: There is almost no gap between beads on the surface of the molded article of expanded beads, and irregularities caused by through holes and the like are not conspicuous, indicating a good surface state.

B: Irregularities caused by gaps between beads and/or through holes and the like are slightly observed on the surface of the molded article of expanded beads.

C: Irregularities caused by gaps between beads and/or through holes and the like are remarkably observed on the surface of the molded article of expanded beads.

The voidage of the molded article, the density of the molded article, and the 50% compressive stress were measured using a molded article obtained at the lowest molding pressure (MPa (G)) in a moldable range without pressurization or aging as mentioned above. Specifically, a molded article that had been demolded and allowed to stand for 12 hours under the conditions of a relative humidity of 50%, 23° C., and 1 atm was used for each measurement. In Example 2 and Comparative Example 2, molded articles obtained at a molding pressure of 0.34 MPa (G) were allowed to stand for 12 hours under the conditions of a relative humidity of 50%, 23° C., and 1 atm and used for each.

Voidage of Molded Article

The voidage of the molded article was determined as follows. A rectangular parallelepiped (20 mm long×100 mm wide×20 mm high) test piece cut out from the central portion of the molded article was immersed in ethanol contained in a measuring cylinder, and the true volume Vc [L] of the test piece was determined from the increase in the liquid level of ethanol. In addition, the apparent volume Vd [L] was determined from the outer dimensions of the test piece. The voidage of the molded article was determined from the determined true volume Vc and the apparent volume Vd by Formula (2) below.

$$\text{Voidage (\%)} = [(Vd - Vc)/Vd] \times 100 \qquad (2)$$

Density of Molded Article

The density ($kg/m^3$) of the molded article is calculated by dividing the weight (g) of the molded article by the volume (L) determined from the outer dimensions of the molded article and performing conversion of the unit.

Rigidity

The rigidity was evaluated by measuring the 50% compressive stress. Specifically, first, a test piece having a length of 50 mm×a width of 50 mm×a thickness of 25 mm was cut out from the central portion of the molded article so that a skin layer on the surface of the molded article was not included in the test piece. In accordance with JIS K 6767: 1999, a compression test was performed at a compression rate of 10 mm/min to determine the 50% compressive stress of the molded article. The density of the test piece used for the measurement of the 50% compressive stress was determined in a similar manner to that in the measurement of the density of the molded article and was shown in Tables 6 and 7 as the "density of the cut molded article".

Water Cooling Time

In the "Production of molded article" section described later, after the completion of heating and the release of the pressure, the time (that is, water cooling time) required for water cooling until the value of the surface pressure gauge attached to the inner surface of the molding mold decreased to 0.04 MPa (G) was measured.

Drying Cycle

The drying cycle was evaluated as follows. The water content was measured for a molded article obtained at the lowest value MPa (G) among molding pressures (MPa (G)) in a moldable range without pressurization or aging in the "Production of molded article" section described later and dried for 2 hours under the conditions of a relative humidity of 50%, 80° C., and 1 atm and was evaluated according to the following criteria. It is noted that the water content (%) of the molded article was calculated from the mass Ww (g) of the molded article before drying and mass Wd (g) of the molded article after drying using the following formula (9).

$$\text{Water content (\%)} = [(Ww - Wd)/Ww] \times 100 \quad (9)$$

Good: The water content was 3% or less.
Poor: The water content was more than 3%.

A method for producing expanded beads and a method for producing a molded article in Examples 1 to 8 and Comparative Examples 1 to 6 will be described below.

Example 1

Production of Polypropylene-Based Resin Expanded Beads

Multilayer resin particles were produced by a strand-cut method. A polypropylene-based resin 1 (abbreviated as PP1) was melt-mixed at a maximum set temperature of 245° C. in an extruder for forming a core layer to provide a resin melt. The characteristics of PP1 are shown in Table 1. In addition, a polypropylene-based resin 6 (abbreviated as PP6) was melt-mixed at a maximum set temperature of 245° C. in an extruder for forming a covering layer to provide a resin melt. Next, the respective resin melts were extruded from the extruder for forming a core layer and the extruder for forming a covering layer through a small hole of a coextrusion die having a hole diameter for forming a through hole. At this time, the resin melts were joined in the die to form a sheath-core type composite including a tubular core layer in an unfoamed state and a covering layer in an unfoamed state covering an outer surface of the tubular core layer. The composite was extruded from a pore of a spinneret attached to a tip of the extruders into a strand having a tubular shape with a through hole, and the strand was cooled with water while being taken up and then cut with a pelletizer so that a mass was about 1.5 mg. In this way, multilayer resin particles each including a cylindrical core layer having a through hole and a covering layer covering the core layer were obtained. In the production of the multilayer resin particles, zinc borate as a cell controlling agent was supplied to the extruder for forming a core layer, so that 500 ppm by mass of zinc borate was contained in the polypropylene-based resin.

In a 5-L sealed container, 1 kg of the multilayer resin particles were put together with 3 L of water as a dispersion medium, and 0.3 parts by mass of kaolin as a dispersant and 0.004 parts by mass of a surfactant (sodium alkylbenzenesulfonate) based on 100 parts by mass of the multilayer resin particles were added into the sealed container. After 70 g of dry ice as a foaming agent was added into the sealed container, the sealed container was sealed, and the inside of the sealed container was heated to a foaming temperature of 157.2° C. while being stirred. The pressure inside the container (impregnation pressure) at this time was 3.7 MPa (G). After holding at the same temperature (that is, 157.2° C.) for 15 minutes, the container contents were released to atmospheric pressure to provide expanded beads. The expanded beads were dried at 23° C. for 24 hours. In this way, expanded beads having a bulk ratio of 40.0 were obtained. The product is referred to as expanded beads A.

Production of Molded Article

To produce a molded article, the expanded beads dried at 23° C. for 24 hours were used. Next, an exhaust step was performed in which the expanded beads were filled in a flat plate molding mold having a length of 300 mm×a width of 250 mm×a thickness of 60 mm and a cracking size adjusted to 20% (that is, 12 mm), the mold was clamped, and steam was supplied from both surfaces of the mold for 5 seconds to preheat the mold. Thereafter, steam was supplied from one surface side of the mold to perform one-side heating until a pressure lower than a predetermined molding pressure by 0.08 MPa (G) was reached. Next, steam was supplied from the other surface side of the mold until the pressure reached 0.04 MPa (G) lower than the molding pressure to perform one-side heating, and then heating (that is, main heating) was performed until the pressure reached a predetermined molding pressure. After completion of the heating, the pressure was released, water cooling is performed until the surface pressure caused by the expanding force of the molded article reached 0.04 MPa (G), and then demolding from the mold is performed to provide a molded article.

Example 2

Using the expanded beads A, a molded article was produced under the molding conditions changed as shown in Table 6.

Example 3

The expanded beads A were placed in a sealed container, the expanded beads were pressurized with compressed air, pre-pressurization was performed to apply the internal pressure shown in Table 6 to the expanded beads in advance, and then the expanded beads were filled in a molding mold and molded under the molding conditions shown in Table 6 to produce a molded article.

Example 4

Expanded beads having a bulk ratio of 37.5 times as shown in Tables 2 and 3 were obtained in a similar manner to that in Example 1 except that the foaming temperature and the foaming agent impregnation pressure were changed to the values shown in Table 2. The expanded beads of this example are referred to as "expanded beads B". A molded article was produced in a similar manner to that in Example 1 except that the expanded beads B were used and that the molding conditions were changed as shown in Table 6.

Example 5

Expanded beads having a bulk ratio of 40.0 times as shown in Tables 2 and 3 were obtained in a similar manner to that in Example 1 except that a polypropylene-based resin 1 was changed to a mixed resin (abbreviated as PP4) of PP1 serving as a first polypropylene-based resin and PP2 serving as a second polypropylene-based resin and that the foaming temperature and the foaming agent impregnation pressure were changed to the values shown in Table 2. The expanded beads of this example are referred to as "expanded beads D". The mixing ratio (in terms of mass ratio) of PP1 and PP2 was 80:20 (PP1:PP2). The characteristics of PP4 are shown in Table 1. A molded article was produced in a similar manner to that in Example 1 except that the expanded beads D were used and that the molding conditions were changed as shown in Table 6.

Example 6

Expanded beads having a bulk ratio of 39.1 times as shown in Tables 2 and 3 were obtained in a similar manner to that in Example 1 except that a polypropylene-based resin 1 was changed to a mixed resin (abbreviated as PP5) of PP1 serving as a first polypropylene-based resin and PP2 serving as a second polypropylene-based resin and that the foaming temperature and the foaming agent impregnation pressure were changed to the values shown in Table 2. The expanded beads of this example are referred to as "expanded beads J". The mixing ratio (in terms of mass ratio) of PP1 and PP2 was 95:5 (PP1:PP2). The characteristics of PP5 are shown in Table 1. A molded article was produced in a similar manner to that in Example 1 except that the expanded beads J were used and that the molding conditions were changed as shown in Table 6.

Example 7

Expanded beads having a bulk ratio of 17.7 times as shown in Tables 2 and 3 were obtained in a similar manner to that in Example 1 except that the foaming temperature and the foaming agent impregnation pressure were changed to the values shown in Table 2. The expanded beads of this example are referred to as "expanded beads K". A molded article was produced in a similar manner to that in Example 1 except that the expanded beads K were used and that the molding conditions were changed as shown in Table 6.

Example 8

Expanded beads having a bulk ratio of 35.7 times as shown in Tables 2 and 3 were obtained in a similar manner to that in Example 1 except that a carbon black is added to the core layer and a cover layer in an amount of 2.7 mass % respectively, and that the foaming temperature and the foaming agent impregnation pressure were changed to the values shown in Table 2. The expanded beads of this example are referred to as "expanded beads L". A molded article was produced in a similar manner to that in Example 1 except that the expanded beads L were used and that the molding conditions were changed as shown in Table 6.

Comparative Example 1 and Comparative Example 2

These examples are examples of expanded beads having large through holes. In these examples, expanded beads having a bulk ratio of 36.0 times as shown in Tables 4 and 5 were obtained in a similar manner to that in Example 1 except that the through hole was enlarged by changing the hole diameter (that is, the die inner diameter) of the small hole of the die for forming the through hole and that the foaming temperature and the foaming agent impregnation pressure were changed to the values shown in Table 4. The expanded beads of these examples are referred to as "expanded beads E". A molded article was produced in a similar manner to that in Example 1 except that the expanded beads E were used and that the molding conditions were changed as shown in Table 7. As for the expanded beads E, the moldable range without pressurization or aging was narrow in some degree. Further, the obtained molded article was remarkably inferior in rigidity and appearance, and was insufficient in drying cycle.

Comparative Example 3

This example is an example of expanded beads having no through hole. In this example, resin particles having no through hole were produced at the time of producing multilayer resin particles. In addition, the foaming temperature and the foaming agent impregnation pressure were changed to the values shown in Table 4. Expanded beads (specifically one-step expanded beads) having a bulk ratio of 17.8 times were obtained in a similar manner to that in Example 1 except for the above. Next, the one-step expanded beads were placed in the pressure-resistant container, air was injected into the pressure-resistant container to increase the pressure in the container, and the air was impregnated into the cells to increase the internal pressure in the cells of the one-step expanded beads. The pressure in the cells of the one-step expanded beads (as gauge pressure) is the value shown in Table 2. Next, the one-step expanded beads were taken out from the pressure-resistant container and put in a drum made of metal, then steam was supplied so that the pressure in the drum equaled the steam pressure at heating as shown in Table 2, and the expanded beads were heated under atmospheric pressure. As described above, the apparent density of the one-step expanded beads was reduced to provide expanded beads (two-step expanded beads) having a bulk ratio of 37.5 times. The expanded beads thus obtained are referred to as "expanded beads F". The expanded beads F were substantially spherical expanded beads having no through hole. A molded article was produced in a similar manner to that in Example 1 except that the expanded beads F were used and that the molding conditions were changed as shown in Table 7. As for the expanded beads F, the moldable range without pressurization or aging was narrow.

Comparative Example 4

This example is an example of expanded beads each having a foamed core layer composed of a polypropylene-based resin having a small flexural modulus. In this example, PP1 was changed to PP2, and the foaming temperature and the foaming agent impregnation pressure were changed to the values shown in Table 4. Further, in a similar manner to that in Comparative Example 3, one-step expanded beads were obtained, and then the apparent density of the one-step expanded beads was reduced to produce two-step expanded beads having a bulk ratio of 37.5 times. The characteristics of PP2 are shown in Table 1. The expanded beads (that is, the two-step expanded beads) of this example are referred to as "expanded beads G". A molded article was produced in a similar manner to that in Example 1 except that the expanded beads G were used and that the molding conditions were changed as shown in Table 7. As for the expanded beads G was inferior in moldability. Further, the moldable range without pressurization or aging was narrow.

Comparative Example 5

This example is an example of expanded beads each having a foamed core layer composed of a polypropylene-based resin having a high melting point. In this example, expanded beads having a bulk ratio of 34.6 times were produced in a similar manner to that in Example 1 except that PP1 was changed to a polypropylene-based resin 3 (abbreviated as PP3) and that the foaming temperature and the foaming agent impregnation pressure were changed to the values shown in Table 4. The characteristics of PP3 are shown in Table 1. The expanded beads of this example are referred to as "expanded beads H". A molded article was produced in a similar manner to that in Example 1 except that the expanded beads H were used and that the molding conditions were changed as shown in Table 7. As for the expanded beads H was inferior in moldability. Further, the moldable range without pressurization or aging was narrow.

Comparative Example 6

This example is an example of expanded beads having no covering layer. In this example, expanded beads having a bulk ratio of 41.5 times were produced in a similar manner to that in Example 1 except that PP1 was extruded from one extruder without using the extruder for forming a covering layer. The expanded beads of this example are referred to as "expanded beads I". A molded article was produced in a similar manner to that in Example 1 except that the expanded beads I were used and that the molding conditions were changed as shown in Table 7. As for the expanded beads I was inferior in moldability. Further, the moldable range without pressurization or aging was narrow.

As understood from Tables 1 to 3, 6, and 8, with the expanded beads of Examples 1 to 8, molding without pressurization or aging is possible, and even by molding without pressurization or aging, molded articles of expanded beads excellent in appearance and rigidity have been obtained in a wide molding pressure range from a low pressure to a high pressure. Furthermore, the drying times for the molded articles of expanded beads obtained from the expanded beads of Examples 1 to 8 are short. Therefore, a molded article of expanded beads excellent in rigidity and appearance can be produced with high producibility.

What is claimed is:
1. An expanded bead having a tubular shape with a single through hole, comprising:
a foamed core layer comprising a polypropylene-based resin; and
a covering layer comprising a polyolefin-based resin, the covering layer covering the foamed core layer,
wherein the polyolefin-based resin of the covering layer has a melting point Tms that is lower than a melting point Tmc of the polypropylene-based resin of the foamed core layer,
wherein an average hole diameter d of the through hole of the expanded bead is less than 1 mm,
wherein a d/D ratio of the average hole diameter d to an average outer diameter D of the expanded bead is 0.3 or less,
wherein a t/D ratio of an average wall thickness t to the average outer diameter D is 0.35 or more and 0.5 or less,
wherein the polypropylene-based resin of the foamed core layer has a flexural modulus of 1,200 MPa or more, and
wherein the melting point Tmc of the polypropylene-based resin is 158° C. or lower.
2. The expanded bead of claim 1, wherein the average outer diameter D of the expanded bead is 2 mm or more and 5 mm or less.
3. The expanded bead of claim 1, having an average wall thickness t of 1.2 mm or more and 2 mm or less.
4. The expanded bead of claim 1, wherein the d/D ratio is 0.25 or less.
5. The expanded bead of claim 1, wherein the polypropylene-based resin of the foamed core layer is an ethylene-propylene random copolymer, and
wherein the ethylene-propylene random copolymer has 0.5 mass % or more and 2 mass % or less of ethylene component.
6. The expanded bead of claim 1, wherein the melting point of the polypropylene-based resin of the foamed core layer is 145° C. or higher and 155° C. or lower.
7. The expanded bead of claim 1, wherein a melt mass flow rate of the polypropylene-based resin of the foamed core layer is 6 g/10 min or more and 10 g/10 min or less.
8. The expanded bead of claim 1, having an apparent density of 10 kg/m³ or more and 100 kg/m³ or less.
9. The expanded bead of claim 1, wherein the foamed core layer comprises the polypropylene-based resin as a primary component by mass.
10. The expanded bead of claim 1, wherein the foamed core layer further comprises a second polymer in an amount of 20 mass % or less.
11. The expanded bead of claim 1, wherein the foamed core layer further comprises a second polymer in an amount of 10 mass % or less.
12. The expanded bead of claim 1, wherein the foamed core layer further comprises a second polymer in an amount of 5 mass % or less.
13. The expanded bead of claim 1, wherein a ratio of an apparent density of the expanded beads to a bulk density of the expanded beads is 1.7 or more and 2.3 or less.
14. The expanded bead of claim 1, wherein the polypropylene-based resin comprises at least 98 mass % of propylene component.
15. The expanded bead of claim 1, wherein the foamed core layer comprises the polypropylene-based resin as a first polypropylene-based resin, and further comprises a second polypropylene-based resin,
wherein the first and second polypropylene-based resins have different melting points,
wherein the first polypropylene-based resin has a flexural modulus of 1200 MPa or more, and
wherein the first polypropylene-based resin has a melting point of 158° C. or lower.
16. The expanded bead of claim 15, wherein the first polypropylene-based resin is present in a range of from 70 to 97 wt. %, the first polypropylene-based resin having a melting point in a range of from more than 145 to 160° C., and wherein the second polypropylene-based resin is present in a range of from 3 to 30 wt. %, the second polypropylene-based resin having a melting point in a range of more than 135 to 145° C.

17. The expanded bead of claim 15, wherein the first and second polypropylene-based resins amount to 100 wt. % of the foamed core layer.

18. The expanded bead of claim 15, wherein the first polypropylene-based resin is present in a range of from 75 to 95 wt. %, the first polypropylene-based resin having a melting point in a range of from more than 145 to 160° C., and wherein the second polypropylene-based resin is present in a range of from 5 to 25 wt. %, the second polypropylene-based resin having a melting point in a range of more than 135 to 145° C.

19. The expanded bead of claim 15, wherein the first polypropylene-based resin is present in a range of from 80 to 90 wt. %, the first polypropylene-based resin having a melting point in a range of from more than 150 to 155° C., and wherein the second polypropylene-based resin is present in a range of from 10 to 20 wt. %, the second polypropylene-based resin having a melting point in a range of more than 140 to 145° C.

20. A method for producing the expanded bead of claim 1, the method comprising:

expanding a multilayer resin particle having a tubular shape with a single through hole, wherein the multilayer resin particle comprises a core layer comprising a polypropylene-based resin and a covering layer comprising a polyolefin-based resin, wherein the covering layer covers the core layer, wherein the polyolefin-based resin has a melting point $Tmrs$ that is lower than a melting point $Tmrc$ of the polypropylene-based resin of the core layer, wherein an average hole diameter dr of the through hole of the multilayer resin particle is less than 0.25 mm, wherein a dr/Dr ratio of the average hole diameter dr to an average outer diameter Dr of the multilayer resin particle is 0.4 or less, wherein the polypropylene-based resin of the core layer has a flexural modulus of 1,200 MPa or more, wherein the melting point $Tmrc$ of the polypropylene-based resin is 158° C. or lower, and wherein the expanded bead has an apparent density of 10 kg/m$^3$ or more and 100 kg/m$^3$ or less.

* * * * *